Figure 1:
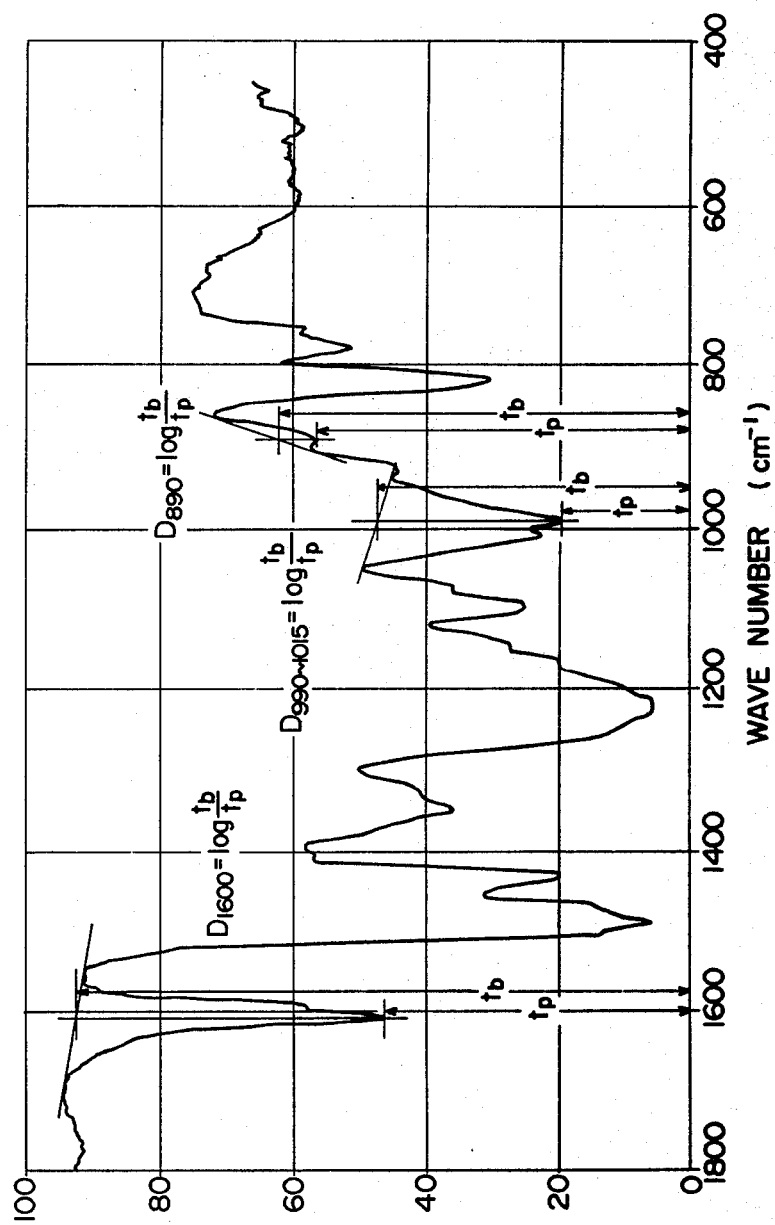

United States Patent [19]

Koyama et al.

[11] Patent Number: 4,466,932

[45] Date of Patent: Aug. 21, 1984

[54] PROCESS FOR PRODUCING CARBON ARTICLES

[75] Inventors: Hiroaki Koyama; Shigeo Shimizu, both of Kobe, Japan

[73] Assignee: Kanebo Ltd., Tokyo, Japan

[21] Appl. No.: 452,622

[22] Filed: Dec. 23, 1982

[30] Foreign Application Priority Data

Dec. 30, 1981 [JP] Japan .................................. 56-211541
Mar. 4, 1982 [JP] Japan .................................. 57-33098

[51] Int. Cl.$^3$ ............................................. B29C 25/00
[52] U.S. Cl. .................... 264/29.3; 264/29.4; 264/29.6
[58] Field of Search .................... 264/29.3, 29.4, 29.6, 264/29.1; 528/129, 137, 162, 163; 525/139

[56] References Cited

U.S. PATENT DOCUMENTS

| | | | |
|---|---|---|---|
| 3,084,394 | 4/1963 | Bickerdike et al. | 264/29.1 |
| 4,071,604 | 1/1978 | Schwemer | 264/29.7 |
| 4,399,052 | 8/1983 | Sugino | 264/29.1 |
| 4,414,378 | 11/1983 | Kyogama et al. | 528/137 |
| 4,414,379 | 11/1983 | Kyogama et al. | 528/137 |

FOREIGN PATENT DOCUMENTS 51-13491 4/1976 Japan .................................. 264/29.1
53-42077 11/1978 Japan .................................. 264/29.1

Primary Examiner—Jay H. Woo
Attorney, Agent, or Firm—Sherman & Shalloway

[57] ABSTRACT

A process for producing a carbon article, which comprises molding a precursor article under heat from a heat-moldable resin composition at least containing a granular or powdery resin resulting from the condensation of a phenol, an aldehyde and optionally a nitrogen-containing compound having at least two active hydrogens, said resin being characterized by (A) containing spherical primary particles and their agglomerated secondary particles, each of which has a particle diameter in the range of 0.1 to 150 microns, (B) having such a size that at least 50% by weight thereof can pass through a 100 Tyler mesh sieve, and (C) having a free phenol content, determined by liquid chromatography, of not more than 500 ppm, or from a heat-moldable species of said resin alone, and thereafter carbonizing the precursor article.

27 Claims, 2 Drawing Figures

PROCESS FOR PRODUCING CARBON ARTICLES

This invention relates to a process for producing a carbon article having excellent strength and high hardness from a novel granular or powdery phenol-aldehyde resin which has good flow characteristics and reactivity and either alone or in admixture with various carbonizable materials, fillers, etc., shows excellent moldability and carbonization yields.

Typical known phenol-aldehyde resins are novolak resins and resol resins. The novolak resins are usually produced by reacting an excess of phenol with formaldehyde in the presence of an acid catalyst such as oxalic acid (usually in an amount of 0.2 to 2%) while maintaining the mole ratio of phenol to formaldehyde at, for example, 1:0.7–0.9. The novolak resins so produced have no self-crosslinkability and are thermoplastic because they are composed of, as main components, tri-, tetra- and pentamers resulting from the bonding of phenol moieties mainly by methylene groups and contain almost no methylol groups. The novolak resins can be converted to cured resins by, for example, reacting them under heat with a crosslinking agent, such as hexamine (hexamethylenetetramine), which is at once a formaldehyde generator and an organic base (catalyst) generator, or by mixing them with a solid acid catalyst and paraformaldehyde and reacting them under heat.

The novolak resin is powdery and easy to handle. But when a molded article of the novolak resin is heat-cured, curing reaction proceeds from the surface of the article toward its inside, and frequently a cured article having an insufficiently cured interior is obtained. If such a cured article is subjected to carbonization, gases are generated in the interior of the article to cause cracks or blisters. As carbonization proceeds, the cracks or blisters become remarkable, and it is extremely difficult to produce a carbon article having a satisfactory quality.

The resol resins are usually supplied as a solution. Hence, it is extremely difficult to mold the resol resin itself after removing the solvent from it because foaming occurs at the time of removing the solvent and gellation proceeds. It is the usual practice therefore to mold it after removing the solvent by using a filler substance. When the resulting molded article is subjected to carbonization, cracks or blisters occur as in the case of the novolak resins, and it is very difficult to produce a carbon article having satisfactory strength or hardness.

A process for producing cured novolak resin fibers was recently suggested which comprises heating a novolak resin at a high temperature to form a product having a considerably high degree of condensation, purifying the product by removing components having a low degree of condensation thereby to obtain a product having a relatively high degree of condensation and comprising phenol moieties linked to each other by 7 to 10 methylene groups, melt-spinning the product to form novolak fibers, dipping the fibers in an aqueous solution of hydrochloric acid and formaldehyde and gradually heating the solution from room temperature to allow curing reaction to proceed from the surface of the fibers (Japanese Patent Publication No. 11284/1973). Granules or powders obtained by cutting or pulverizing the cured fibers are expensive, and do not possess good flow characteristics suitable for molding materials.

A process was suggested recently for the production of a carbon article from a molded article of a composition composed of the aforesaid cured novolak fibers and another carbonizable material (Japanese Laid-open Patent Publication No. 77293/1979). Since as mentioned above the cured novolak fibers do not provide granules or powders having good flow characteristics and do not have heat fusibility, they require another carbonizable material which acts as a binder. Accordingly, they have the disadvantage that they cause blocking up of nozzles during injection molding, or a molded article having the fibers uniformly dispersed therein is difficult to produce.

Several years ago, a process was disclosed which comprises reacting a phenol and formaldehyde in the presence of at least a nitrogen-containing compound as a catalyst, and reacting the resulting condensate with a hydrophilic polymeric compound to form a granular or powdery resin (Japanese Patent Publication No. 42077/1978). The resulting resin in the non-gelled state contains as much as about 5 to 6% of free phenol (Examples 1 to 4 of the Japanese patent document), and a gelled product of the resin (Example 5 of the Japanese patent document) is a very hard non-reactive resin and contains the hydrophilic polymeric compound. For this reason, a molded article obtained by using this resin as a filler has deteriorated properties, and a carbonized article obtained from this molded article has cracks or gas blisters.

A process is also known which comprises reacting a phenol and formaldehyde in a basic aqueous solution, mixing the resulting prepolymer with a protective colloid, and coagulating the prepolymer under acidity to form inert solid beads (Japanese Patent Publication No. 13491/1976). The coagulated product corresponds to a cured product of a resol resin, and has no reactivity. Furthermore, since it contains a salt or acid and the protective colloid, a molded article obtained by using the beads has deteriorated properties, and a carbonized article obtained from this molded article has cracks or gas blisters.

Attempts have been made to use phenol-aldehyde resins as a filler for molded articles as stated hereinabove. It is especially difficult however to obtain the phenol-aldehyde resins in a shape or form suitable for fillers. Furthermore, the phenol-aldehyde resin are disadvantageous as fillers for molded articles in that they contain substances which adversely affect molded articles, particularly those for use in carbonization.

The present inventors previously provided a novel granular or powdery phenol-aldehyde resin free from the aforesaid defects, and a process for its production.

It is an object of this invention therefore to provide a process for producing a carbon article by using the novel granular or powdery phenol-aldehyde resin as a carbonizable material.

Another object of this invention is to provide a process for producing a carbon article having excellent strength and high hardness by using a granular or powdery phenol-aldehyde resin having good flow characteristics as a carbonizable material.

Still another object of this invention is to provide a process for producing a carbon article in a high carbonization yield from a precursor article (a molded article for carbonization) or a granular or powdery phenol-aldehyde resin as a carbonizable material.

Yet another object of this invention is to provide a process which comprises preparing a precursor article having little cracks or gas blisters and substantially no variation in quality between its interior and surface by using a granular or powdery phenol-aldehyde resin having reactivity with itself or with another resin, and converting the precursor article to a carbon article free from cracks or gas blisters and having uniform quality throughout.

A further object of this invention is to provide a process for producing a spongy carbon article having excellent strength and high hardness.

A still further object of this invention is to provide a process for producing a carbon article having excellent strength, high hardness, and a very high specific surface area.

A yet further object of this invention is to provide a process for producing a carbon article which has excellent strength and high hardness and shows electrical conductivity ranging from a conductor to a semiconductor.

Still another object is to provide a process for producing a carbon article which has excellent strength and high hardness and shows excellent heat resistance, abrasion resistance, sliding characteristics, gas sealing property or chemical resistance.

An additional object of this invention is to provide a carbon article having a high specific surface article.

Figure 2:
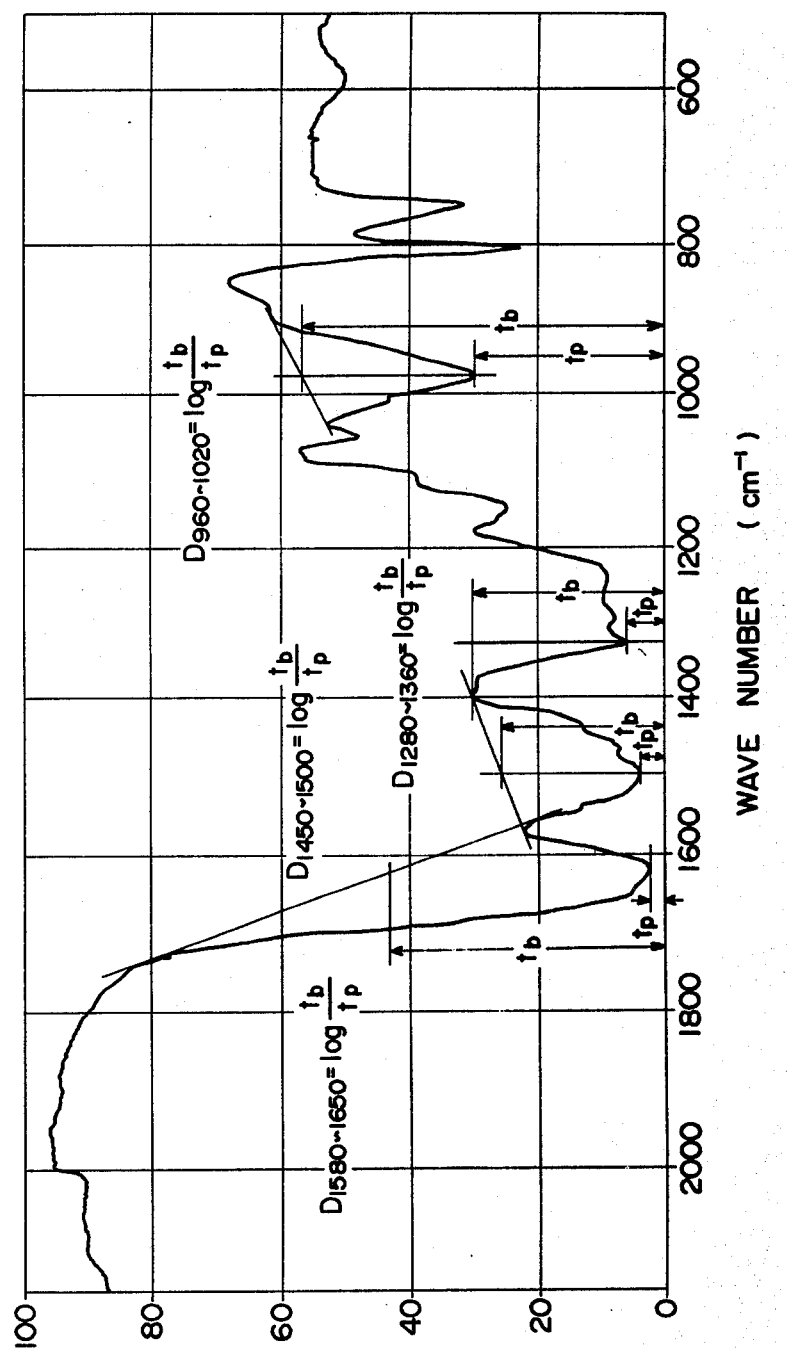

Other objects and advantages of this invention will be apparent from the following description and the accompanying drawings in which:

FIGS. 1 and 2 are each infrared absorption spectral charts by the KBr method of the granular or powdery resin obtained from phenol and formaldehyde obtained in Run No. 44 and from phenol, formaldehyde and urea obtained in Run No. 112, respectively.

In accordance with this invention, these objects and advantages are achieved by a process for producing a carbon article, which comprises molding a precursor article under heat from a heat-moldable resin composition at least containing a granular or powdery resin resulting from the condensation of a phenol, an aldehyde and optionally a nitrogen-containing compound having at least two active hydrogens, said resin being characterized by (A) containing spherical primary particles and their agglomerated secondary particles, each of which has a particle diameter in the range of 0.1 to 150 microns, (B) having such a size that at least 50% by weight thereof can pass through a 100 Tyler mesh sieve, and (C) having a free phenol content, determined by liquid chromatography, or not more than 500 ppm, or from a heat-moldable species of said resin alone, and thereafter carbonizing the precursor article.

The granular or powdery phenol-aldehyde resin used in this invention is produced from a phenol, an aldehyde and optionally a nitrogen-containing compound having at least two hydrogens by a method to be described hereinbelow.

The granular or powdery phenol-aldehyde resin (to be referred to as the granular or powdery resin) is characterized by (A), (B) and (C) stated above. The limitation that the spherical primary particles and their secondary agglomerated particles have a particle diameter of 0.1 to 150 microns (A), the limitation that at least 50% by weight of the entire resin can pass through a 100 Tyler mesh sieve (B), and the limitation that the resin has a free phenol content, determined by liquid chromatography, of not more than 500 ppm (C) are based on the measuring methods to be described hereinbelow.

A first feature of the product of the invention is that it consists mostly of spherical primary particles and secondary particles resulting from the agglomeration of the primary particles, each having a particle diameter of 0.1 to 150 microns, preferably 0.1 to 100 microns as specified in (A) above and is quite different from a forcibly pulverized product of a cured product of a known novolak or resol resin or a pulverization product of known cured novolak fibers.

Usually at least 30%, preferably at least 50%, of the granular or powdery resin consists of spherical primary particles and their agglomerated secondary particles each of which has a particle diameter of 0.1 to 150 microns, preferably 0.1 to 100 microns.

In the case of the granular or powdery resin containing the nitrogen-containing compound, usually at least 30%, preferably at least 50%, thereof consists of spherical primary particles and secondary particles resulting from the agglomeration of the primary particles, each of which has a particle diameter of 0.1 to 100 microns, preferably 0.1 to 50 microns. The expression 30% or 50% means that as defined in the description of the method for measuring the particle diameter given hereinbelow, it is 30% or 50% based on the number of entire particles (including the secondary agglomerated particles) of the resin in one visual field of an optical microscope having a magnification of 100 to 1,000. It is preferred that 70% to substantially 100% of the granular or powdery product consists of spherical primary particles and secondary agglomerated particles each having a particle diameter of 0.1 to 150 microns (0.1 to 100 microns in the case of the resin containing the nitrogen-containing compound). Especially preferably, at least 30%, particularly at least 50%, of the number (as an average of those in five visual fields) of particles in the visual field of a microphotograph in accordance with the above definition consists of spherical primary particles and secondary agglomerated particles having a particle diameter in the range of 0.1 to 100 microns, preferably 0.1 to 50 microns (in the case of the resin containing the nitrogen-containing compound, 0.1 to 50 microns, preferably 0.1 to 20 microns).

Since the granular or powdery resin product used in this invention is formed mainly of the minute spherical primary particles and the secondary agglomerated particles thereof, it is very small in size as specified in (B) above. Thus, at least 50% by weight, preferably at least 70% by weight, especially preferably at least 80% by weight, of the entire resin passes through a 100 Tyler mesh sieve (a 150 Tyler mesh sieve in the case of the resin containing the nitrogen-containing compound). The expression "passing through the sieve" does not exclude the exertion of a force which does not cause forcible destruction of the particles (including the secondary agglomerated particles) in the procedure of screening the granular or powdery product through the sieve, for example light crumpling of the granular or powdery product by hand, light pushing or levelling of the particles on the mesh by means of a brush, or light tapping of the particles by hand because the particles of the granular or powdery resin of this invention become agglomerated as their average particle size becomes smaller.

As specified in (C) above, the granular or powdery resin used in the invention has a free phenol content, determined by liquid chromatography, of not more than 500 ppm. The preferred free phenol content is not more than 250 ppm, above all not more than 100 ppm, for the resin containing the nitrogen-containing compound, and above 50 ppm but not more than 400 ppm, especially above 50 ppm but not more than 300 ppm. That the powdery or granular resin used in the invention has a very low free phenol content is presumably because the process for its production described hereinbelow comprises adding the phenol or the phenol and the nitrogen-containing compound or the diluted solution thereof to the HCl-aldehyde bath to form a uniform solution at least partly, then forming very fine white suspended particles and developing them into stable fine particles, and therefore, substantially all of the phenol added, especially the phenol which participates in the formation of the product of the invention, reacts with the aldehyde present in large excess. The granular or powdery products obtained by the methods disclosed in Japanese Patent Publication No. 42077/1978 cited above has a free phenol content of as high as 0.3 to about 6% by weight. In contrast, the free phenol content of the granular or powdery resin used in the invention is quite small, and this fact is an important advantage of the process of the invention using granular or powdery resins of this kind and is very surprising.

The granular or powdery resin used in this invention may also be defined by the ratio of the absorption intensity of an absorption peak assigned to the aromatic double bond to that of an absorption peak assigned to the methylol group in its infrared absorption spectrum. The positions of the two peaks and their absorption intensities differ somewhat depending upon the presence or absence of the nitrogen-containing compound.

The granular or powdery resin substantially free from the nitrogen-containing compound has a $D_{990\text{-}1015}/D_{1600}$ ratio of from 0.2 to 9.0 in its infrared absorption spectrum determined by a KBr tablet method, wherein $D_{1600}$ represents the absorption intensity of an absorption peak at 1600 cm$^{-1}$ (the peak assigned to benzene) and $D_{990\text{-}1015}$ represents the highest absorption intensity of absorption peaks in the range of 990 to 1015 cm$^{-1}$ (the peaks assigned to the methylol groups). This resin further has a $D_{890}/D_{1600}$ ratio, wherein $D_{890}$ represents the absorption intensity of a peak at 890 cm$^{-1}$ (the peak assigned to a lone hydrogen atom on the benzene ring), of from 0.09 to 1.0. Preferably, it has a $D_{990\text{-}1015}/D_{1600}$ ratio of from 0.2 to 7.0, especially from 0.4 to 5.0, and a $D_{890}/D_{1600}$ ratio of from 0.1 to 0.9, especially from 0.12 to 0.8.

It is widely known with regard to phenol-formaldehyde resins that in their infrared absorption spectra, the peak at 1600 cm$^{-1}$ shows an absorption assigned to the benzene ring, the peaks at 990 to 1015 cm$^{-1}$ shows absorptions assigned to the methylol groups, and the peak at 890 cm$^{-1}$ shows an absorption assigned to a lone hydrogen atom on the benzene ring.

The granular or powdery resin containing the nitrogen-containing compound has a $D_{960\text{-}1020}/D_{1400\text{-}1500}$ ratio of from 0.1 to 2.0 in its infrared absorption spectrum measured by a KBr tablet method, wherein $D_{1450\text{-}1500}$ represents the highest absorption intensity of absorption peaks in the range of 1450 to 1500 cm$^{-1}$ (the peaks assigned to the aromatic double bond) and $D_{960\text{-}1020}$ represents the highest absorption intensity of absorption peaks in the range of 960 to 1020 cm$^{-1}$ (the peaks assigned to the methylol groups), and preferably further has a $D_{1280\text{-}1360}/D_{1450\text{-}1500}$ ratio of 0.15 to 3.0 in the infrared absorption spectrum, wherein $D_{1280\text{-}1360}$ represents the highest absorption intensity of absorption peaks in the range of 1280 to 1360 cm$^{-1}$ (the peaks assigned to the carbon-nitrogen bond).

Preferably, this resin has a $D_{960\text{-}1020}/D_{1450\text{-}1500}$ ratio of from 0.15 to 0.6 and further a $D_{1280\text{-}1360}/D_{1450\text{-}1500}$ ratio of from 0.2 to 2.0. Especially preferably it has a $D_{960\text{-}1020}/D_{1450\text{-}1500}$ ratio of from 0.2 to 0.4, and further a $D_{1280\text{-}1360}/D_{1450\text{-}1500}$ ratio of from 0.3 to 1.5.

The resin used in this invention further has such a characteristic in its infrared absorption spectrum determined by a KBr tablet method that it has a $D_{1580\text{-}1650}/D_{1450\text{-}1500}$ ratio of from 0.3 to 4.5, preferably from 0.75 to 2.0, especially preferably from 1.0 to 1.5, wherein $D_{1580\text{-}1650}$ represents the highest absorption intensity of absorption peaks in the range of 1580 to 1650 cm$^{-1}$.

Generally, it is difficult to determine the assignment of various functional groups of a substance having a three-dimensional crosslinked structure by an infrared absorption spectroscopic method because peaks in its infrared absorption spectral chart frequently shift greatly. But from the infrared absorption spectra of the phenol-aldehyde resin and various nitrogen-containing compounds, it has been determined that in the infrared absorption spectrum of the resin of this invention, the absorption peaks at 960 to 1020 cm$^{-1}$ are assigned to the methylol groups, the absorption peaks at 1280 to 1360 cm$^{-1}$ are assigned to the carbon-nitrogen bond, and the absorption peaks at 1450 to 1500 cm$^{-1}$ are assigned to the aromatic double bond.

The definite assignment of the absorptions at 1580 to 1650 cm$^{-1}$ is difficult. But since the $D_{1580\text{-}1650}/D_{1450\text{-}1500}$ using the highest absorption intensity of the peaks at 1580 to 1650 cm$^{-1}$ can clearly distinguish from the same ratio in a nitrogen-free phenol-formaldehyde resin, these absorptions can be recognized as characteristic absorptions for identifying the granular or powdery resin containing the nitrogen-containing compound.

It is understood that the ratio of absorption intensities in the infrared absorption spectrum of the resin used in f this invention, for example, $D_{990\text{-}1015}/D_{1600}=0.2\text{-}9.0$ or $D_{960\text{-}1020}/D_{1450\text{-}1500}=0.1\text{-}2.0$ which is one parameter for specifying the granular or powdery resin used in this invention, is a value associated with its structure and shows that this resin contains a considerable amount of the methylol groups and the methylol group content can be adjusted within a certain range.

The preferred product of this invention having a $D_{990\text{-}1050}/D_{1600}$ ratio of from 0.2 to 7.0, or a $D_{960\text{-}1020}/D_{1450\text{-}1500}$ ratio of from 0.15 to 0.6, and above all a $D_{990\text{-}1015}/D_{1600}$ ratio of from 0.4 to 5.0 or a $D_{960\text{-}1020}/D_{1450\text{-}1500}$ ratio of from 0.2 to 0.4 contain methylol groups in a moderate degree of concentration and is stabler.

The fact that in its infrared absorption spectrum the granular or powdery resin used in this invention has a $D_{890}/D_{1600}$ ratio of from 0.09 to 1.0, preferably from 0.1 to 0.9, above all from 0.12 to 0.8, shows that in this resin, the reaction sites (the ortho- and para-positions) of phenol molecules which participate in the reaction are moderately blocked by methylol groups.

Generally, one or both of the $D_{990\text{-}1015}/D_{1600}$ ratio and the $D_{890}/D_{1600}$ ratio of a cured product of a known resol resin are lower than those of the granular or powdery resin used in this invention. A cured product of a known novolak resin cured with hexamine has a $D_{890}/D_{1500}$ ratio which is generally lower than the lower limit of this ratio of the product of this invention.

It has been found by elemental analysis that the granular or powdery resin used in this invention which is substantially free from the nitrogen-containing compound is composed of carbon, hydrogen and oxygen and has the following composition.

C: 70 to 80% by weight
H: 5 to 7% by weight
O: 17 to 21% by weight
(total 100% by weight)

It has also been found that many of the granular or powdery resins used in this invention which contain the nitrogen-containing compound contain at least 1% by weight, preferably 2 to 30% by weight, of nitrogen.

The granular or powdery resin used in this invention can be obtained either as a resin whose curing reaction has not proceeded to a great extent or as a resin whose curing reaction has proceeded to some extent, by the manufacturing process to be described hereinbelow. Accordingly, when the granular or powdery resin used in this invention is pressed at 100° C. for 5 minutes in accordance with the heat fusibility test to be described hereinbelow, at least a part of the resin fuses to form a lumpy or plate-like mass (i), or the resin assumes the form of granules or powder without substantial melting or melt-adhesion (ii).

Those granular or powdery resins used in this invention which have relatively high heat fusibility as mentioned above shows a methanol solubility, measured by the testing method to be given hereinbelow, of at least 20% by weight, especially at least 30% by weight, and in some cases, at least 40% by weight.

Since the granular or powdery resin contains spherical primary particles and their secondary agglomerated particles each having a particle diameter of 0.1 to 150 microns [the characteristic (A) described hereinabove] in an amount of usually at least 50% by weight, preferably at least 70% by weight, of the resin particles can pass through a 100 Tyler mesh sieve, the resin has very good flowability, and can be mixed with another material easily and in a relatively large amount. Furthermore, since many of the granular or powdery resins used in this invention contain very minute spherical primary particles as a basic constituent, a cured molded article prepared from a resin composition containing this resin has excellent mechanical properties, particularly high resistance to compression. The granular or powdery resins are very stable at ordinary temperatures and contain considerable amounts of methylol groups. Hence, they show reactivity when heated, and give cured molded articles having not only excellent physical and mechanical properties but also excellent thermal insulation, heat resistance and electrical properties such as electrical insulation, and chemical resistance.

Furthermore, the granular or powdery resin has a free phenol content of usually not more than 500 ppm, and therefore, its handling is very easy and safe. Furthermore, because of its very low free phenol content, a side-raction attributed to the phenol is reduced in obtaining a precursor article from the granular or powdery resin.

The granular or powdery resin does not substantially contain a hydrophilic polymeric compound because it is produced by a process in which the reaction system does not substantially contain a hydrophilic polymeric compound.

The granular or powdery resin used in this invention is very fine and has good storage stability and flow characteristics. Furthermore, because it contains a certain amount of methylol groups, it has reactivity when molded into a precursor article and heated. Hence, it gives a cured article having uniform properties.

The granular or powdery resin used in this invention can be produced by contacting a phenol, or both a phenol and a nitrogen-containing compound containing at least two active hydrogens, with a hydrochloric acid-aldehyde bath containing (a) hydrochloric acid (HCl) in a concentration of 3 to 28% by weight, preferably 8 to 25% by weight, above all 12 to 22% by weight and (b) formaldehyde (HCHO) in a concentration of 3 to 25% by weight, preferably 5 to 20% by weight, above all 7 to 15% by weight, and other aldehydes in a concentration of 0 to 10% by weight with (c) the total concentration of hydrochloric acid and formaldehyde being 10 to 40% by weight, preferably 15 to 35% by weight, above all 20 to 32% by weight, while maintaining a bath ratio, defined by the quotient of the weight of the hydrochloric acid-aldehyde bath divided by the total weight of the phenol and the nitrogen-containing compound, of at least 8.

Preferably, in addition to the three requirements (a), (b) and (c), the composition of the HCl-aldehyde bath is such that the mole ratio of the aldehyde in the bath to the phenol to be contacted with the bath or the phenol and the nitrogen-containing compounds combined is at least 2, especially at least 2.5, above all at least 3 [requirement (d)]. There is no particular upper limit to the above mole ratio (d). Preferably, the upper limit is 20, especially 15. The especially preferred mole ratio (d) is from 4 to 15, above all from 8 to 10. The characteristic feature of the aforesaid process is that a bath of an aqueous solution of hydrochloric acid and formaldehyde having a considerably high HCl concentration and containing formaldehyde in molar excess to the phenol or both the phenol and the nitrogen-containing compound is contacted with the phenol or both the phenol and the nitrogen-containing compound at a bath ratio of at least 8, preferably at least 10.

Since the aforesaid process is carried out while the concentration of each of hydrochloric acid and aldehyde is kept at least 3% by weight, and the bath ratio, at not less than 8, the weight percentage of hydrochloric acid or aldehyde based on the weight of the phenol or the total weight of the phenol and the nitrogen-containing compound is at least 24% by weight. Furthermore, since in this process, the total concentration of hydrochloric acid and formaldehyde is at least 10% by weight, the total weight of hydrochloric acid and aldehyde based on the weight of the phenol or the total weight of the phenol and the nitrogen-containing compound is at least 80% by weight. These reaction conditions are fundamentally different from the reaction conditions for the production of known novolak and resol resins described hereinabove.

When the phenol or the phenol and the nitrogen-containing compound are to be contacted with the HCl-aldehyde bath, the bath ratio (as defined hereinabove) is preferably at least 10, especially preferably 15 to 40.

In the aforesaid process, the phenol or the phenol and the nitrogen-containing compound are contacted with the HCl-formaldehyde bath such that after contacting of the phenol with the bath, white suspended particles are formed and thereafter developed into a granular or powdery solid (preferably into a pink-colored granular or powder solid when the nitrogen-containing compound is not used). The contacting of the phenol and the nitrogen-containing compound with the HCl-aldehyde bath is conveniently carried out such that by adding the phenol and the nitrogen-containing compound together to the HCl-aldehyde bath or first adding the nitrogen-containing compound and then the phenol to the path, a clear solution is first formed and then white suspended particles are formed and thereafter developed into a granular or powdery solid. In contacting the bath with the phenol or the phenol and the nitrogen-containing compound, it is preferred that before the white suspended particles are formed by the addition of the phenol, the bath be stirred to form a clear, preferably uniform, solution of the phenol or the phenol and the nitrogen-containing compound, and that after the formation of the white suspended particles until the suspended particles change to a solid, the bath (reaction mixture) be not subjected to a mechanical shearing force such as stirring depending upon the ratio of the phenol to the nitrogen-containing compound or the reaction conditions.

The phenol may be added as such, but if desired, it may be diluted with formalin, an aqueous solution of hydrochloric acid, water, etc. prior to the addition.

The temperature of the HCl-aldehyde bath with or without the nitrogen-containing compound dissolved therein, to which the phenol or both the phenol and the nitrogen-containing compound (or the diluted solution thereof) are to be added, is suitably not more than 90° C., preferably not more than 70° C. If the temperature of the bath is higher than 40° C., especially higher than 50° C., the rate of the reaction of the phenol or the nitrogen-containing compound with aldehyde increases. It is preferred therefore to add the phenol or both the phenol and the nitrogen-containing compound as a solution diluted with formalin. Furthermore, since the rate of the reaction is high, it is preferred to add the phenol, or both the phenol and the nitrogen-containing compound, preferably a diluted solution thereof as fine streams or smallest possible droplets to the bath.

When the phenol or both the phenol and the nitrogen-containing compound are added to the bath having a temperature of more than 40° C., especially more than 50° C., the rate of the reaction of the phenol and the nitrogen-containing compound becomes higher as the temperature of the bath becomes higher. Thus, within several minutes of or instantaneously after the contacting, white suspended particles form and are rapidly developed into a granular or powdery solid.

A granular or powdery solid obtained by adding the phenol or both the phenol and the nitrogen-containing compound, either as such or as a diluted solution thereof, preferably a water diluted solution thereof, to the HCl-aldehyde bath maintained at not more than 40° C., preferably 5° to 35° C., especially preferably 10° to 30° C., and after the formation of white suspended particles, completing the desired reaction at not more than about 50° C., preferably not more than 45° C. shows heat fusibility in the 100° C. fusibility test to be described below because its curing reaction has not proceeded to a great extent.

On the other hand, a granular or powdery solid obtained by adding substantially all of the phenol or the phenol and the nitrogen-containing compound or the diluted solution thereof to the HCl-aldehyde bath maintained at not more than 45° C., preferably 15° to 35° C. with stirring to form a clear solution, thereafter forming white suspended particles without stirring, then forming a granular or powdery solid with or without temperature elevation, and heating the solid at a temperature higher than 50° C., preferably 70° to 95° C., to complete the desired reaction has little or substantially no heat fusibility at 100° C., or shows heat fusibility at a higher temperature, for example at 200° C., or has substantially no heat fusibility at such a high temperature.

When both the phenol and the nitrogen-containing compound are used, it is possible in both of the above-described cases to first add the nitrogen-containing compound to the HCl-formaldehyde bath and then add the phenol alone.

Phenol is most preferred as the phenol. The phenol may also be a mixture of at least 50% by weight, preferably at least 70% by weight, of phenol with at least one known phenol derivative such as o-cresol, m-cresol, p-cresol, bisphenol A, bisphenol S, o-, m- or p-($C_2$–$C_4$ alkyl)phenols, p-phenylphenol, xylenol, resorcinol and hydroquinone.

Suitable formaldehyde supply sources for the HCl-aldehyde bath include formalin, trioxane, tetraoxane and paraformaldehyde.

The HCl-aldehyde bath used in this invention may include up to 10% by weight of an aldehyde other than formaldehyde in addition to the aforesaid formaldehyde supply sources. Examples of suitable other aldehydes are monofunctional aliphatic aldehydes having 2 to 4 carbon atoms, glyoxal, furfural and benzaldehyde. Examples of the monofunctional aliphatic aldehydes include acetaldehyde, propionaldehyde, n-butyl aldehyde and iso-butyl aldehyde. These aldehydes may be used singly or as a mixture of two or more.

The nitrogen-containing compound used in this invention is a compound containing at least two active hydrogens in the molecule. Preferably, it contains in the molecule at least one group having active hydrogens selected from the class consisting of amino groups, amide groups, thioamide groups, ureylene groups and thioureylene groups. Examples of such nitrogen-containing compound are urea, thiourea, methylol derivatives of urea or thiourea, aniline, melamine, guanidine, guanamine, dicyandiamide, fatty acid amides, polyamide, toluidine, cyanuric acid, and functional derivatives of these compounds. They may be used either singly or as a mixture of two or more.

The granular or powdery resin solid formed in the bath as a result of the completion of the desired reaction is separated from the HCl-aldehyde bath, washed with water, preferably treated with an aqueous alkaline solution such as aqueous ammonia or a methanolic aqueous ammonia solution to neutralize the adhering hydrochloric acid, and again washed with water to give the desired product. As a matter of course, a resin having a relatively high solubility in methanol is preferably neutralized with an aqueous alkaline solution.

The process of this invention first comprises forming a precursor article from the granular or powdery resin described above or a resin composition at least containing this granular or powdery resin by heat molding.

The granular or powdery resin used alone or the resin composition should naturally be heat-moldable.

The granular or powdery resin used alone is preferably (i) a phenol-aldehyde resin which is at least partly melted when maintained at 100° C. for 5 minutes in accordance with the heat fusibility test, or a mixture of such as phenol-aldehyde resin and (ii) a phenol aldehyde resin which is not substantially melted or melt-adhered when subjected to the same fusibility test. In the case of the mixture, the latter acts as a filler, and the former, as a binder in the precursor article.

In contrast, in the case of the resin composition containing the granular or powdery resin, the resin does not have to be the resin (i) or the mixture of (i) and (ii) described above. If the resin composition contains a binder which makes the composition heat-moldable, the granular or powdery phenol-aldehyde resin does not have to be fusible. In other words, it may be the fusible resin (i) or the non-fusible resin (ii) if another resin capable of acting as a binder is present.

What is important in this invention is to use the granular or powdery phenol-aldehyde resin as a constituent of the precursor article, and not whether this resin is a filler or a binder for the precursor article. In the production of the precursor article, it should be considered whether the phenol-aldehyde resin is fusible (i) or not (ii), but both the resin (i) and (ii) give a carbon article having excellent strength and hardness by carbonization.

When the precursor article is composed of the granular or powdery phenol-aldehyde resin and the resin is a mixture of the fusible resin (i) and the non-fusible resin (ii), the proportion of the fusible resin (i) is at least 10% by weight, preferably at least 20% by weight, especially preferably at least 30% by weight, based on the amount of the mixture.

In the process of this invention, the resin composition at least containing the granular or powdery phenol-aldehyde resin may contain another carbonizable material.

The carbonizable material may be a curable resin (a first carbonizable material). The first carbonizable material is preferably a heat-curable resin such as resol, novolak, epoxy, furan, melamine and urea resins. Since these carbonizable materials can act as a binder, the granular or powdery phenol-aldehyde resin to be used together may be fusible (i) or non-fusible (ii) when these carbonizable materials are used. Both types of the granular or powdery phenol-aldehyde resin have a high carbon content and are very stable at ordinary temperature because they are obtained by the further reaction of minute white suspended particles, which are the initial-stage reaction product of the phenol, with formaldehyde. Moreover, since these resins contain a considerable amount of methylol groups, they show reactivity when heated, and give an integral precursor article together with the first carbonizable material. Furthermore, since the granular or powdery phenol-aldehyde resin used in this invention is very finely divided and has a high surface area, it easily disperses uniformly in the first carbonizable material, and even a relatively small amount of it can give a carbon article having excellent gas-tightness and being free from gas blisters in a high carbonization yield by firing.

The excellency of the granular or powdery phenol-aldehyde resin used in the process of this invention is demonstrated by the fact that when the precursor article is fired at a temperature of, for example, 1000° C., the carbonization yield is 50 to 54% by weight when the precursor article is composed of a cured resol resin, and 60 to 70% when the precursor article is composed of the granular or powdery phenol-aldehyde resin or a mixture of 50 parts by weight, as solids, of a resol resin and 50 parts by weight of the granular or powdery phenol-aldehyde resin. In view of the fact that when the granular or powdery phenol-aldehyde resin used in this invention is directly fired at the same temperature as mentioned above without going through the stage of a precursor, the carbonization yield is 54 to 58%, it is believed that the granular or powdery phenol-aldehyde resin used in this invention is reactive with itself and with another resin, and a carbon article is obtained in a high carbonization yield from the precursor.

When a precursor article produced by mixing the first carbonizable material with the granular or powdery phenol-aldehyde resin and heat-molding the mixture is fired, a carbon article is obtained in a higher carbonization yield than in the case of firing a precursor article composed only of the carbonizable material.

The carbonizable material used in the resin composition may be a second carbonizable material such as carbon fibers, coke, anthracite, coking bituminous coal, pitch and a cured product of a thermosetting resin.

The second carbonizable material is less reactive with the granular or powdery phenol-aldehyde resin than the first carbonizable material. It is by itself carbonized to a considerable extent, or can give a relatively high carbonization yield. Carbon fibers, coke, anthracite and the cured thermosetting resin act as a filler, the pitch as a binder and coking bituminous coal as a filler or binder, in the precursor article.

The carbonizable material used in the resin composition may be a third carbonizable material.

Examples of the third carbonizable material are carbohydrates such as cellulose (rayon), starch and sugars, derivatives of carbohydrates such as carboxy methyl cellulose, hydroxy ethyl cellulose and acetyl cellulose, and natural materials containing carbohydrates as a main component such as wood flour, linter, coconut shell, rice husk and cereal grain flours; and thermoplastic resins such as polyamides, polyvinyl acetate, vinyl chloride resins, vinylidene chloride resins, acrylic resins, and heat-infusible resins other than cured products of curable resins, such as polyvinyl alcohol and polyvinyl formal.

The third carbonizable material generally has a low carbonization yield, and a carbon article obtained by firing a precursor article containing the third carbonizable material has pores which frequently have an activated inner wall. In other words, the resulting carbon article is porous. According to the process of this invention, even such a porous carbon article generally has high strength and hardness.

In the process of this invention, the resin composition at least containing the granular or powdery phenol-aldehyde resin may contain an inorganic filler in addition to the carbonizable material. Unlike the carbonizable material, the inorganic filler remains uncarbonized during the firing of the precursor article, and is present in the resulting carbon article either as such or in the reduced state.

The inorganic filler is used to impart such properties as heat resistance and semi-conducting property to the carbon article, or to improve certain properties of the carbon article positively. Illustrative of the inorganic filler are silica, alumina, silica-alumina, calcium carbonate, calcium silicate, and noble metals such as gold, silver, palladium and platinum. Porous carbon articles containing noble metals can be used as catalysts for reactions which are catalyzed by such noble metals.

The resin composition used in the process of this invention which at least contains the granular or powdery phenol-aldehyde resin is composed of (1) the granular or powdery phenol-aldehyde resin, and (2) a thermosetting resin (the first carbonizable material) and/or (3) the second or third carbonizable material or the inorganic filler.

When the precursor article is composed of the aforesaid resin composition, it is preferred that at least 10% by weight of the entire composition comprise the granular or powdery phenol-aldehyde resin, and at least 20% by weight of the entire resin comprise a heat-moldable species of the granular or powdery phenol-aldehyde resin [the resin (i) described hereinabove], or the second carbonizable material, or both. More preferably, at least 20% by weight of the entire composition comprises the granular or powdery phenol-aldehyde resin, and at least 30% by weight of the entire composition comprise a heat-moldable species of the granular or powdery phenol-aldehyde resin, or the second carbonizable material, or both. Especially preferably, the proportion of the granular or powdery phenol-aldehyde resin is at least 30% by weight based on the entire composition, and the proportion of the heat-moldable granular or powdery phenol-aldehyde resin, or the second carbonizable material, or both is at least 40% based on the entire composition.

According to the process of this invention, a precursor article is first prepared by molding under heat the granular or powdery phenol-aldehyde resin, or the resin composition at least containing the granular or powdery phenol-aldehyde composition. The resin composition can be produced by mixing the ingredients in a manner known per se using a mixer, a kneader, a roller, etc. The heat molding is carried out by a method known per se, such as injection molding, press-forming or molding in a mold at a temperature above a point at which at least the fusible resin (i) melts (for example at a temperature of about 50° to about 200° C.) when the starting material is the granular or powdery phenol-aldehyde resin alone, or at a temperature above a point at which at least the binder component melts (for example, at a temperature of about 100° to about 150° C.) when the starting material is the resin composition, thereby to give a precursor article having the desired shape.

The heat molding is carried out by external heating. Since the granular or powdery phenol-aldehyde having self-reactivity or reactivity with another resin, a very small particle size and a high specific surface area is used in the process of this invention, not only the granular powdery phenol aldehyde alone but also the resin composition containing it disperses uniformly in the other resin and reacts uniformly when heated. The resulting precursor article undergoes curing substantially uniformly even in its interior, and does not generate any gas which may cause cracks or blisters during the carbonization of the precursor article.

On the other hand, a precursor article obtained by using a resol resin alone shows a difference in the degree of curing between its surface portion to which heat is applied externally and its interior which the heat is difficult of reaching. In many cases, therefore, there is formed an article which is cured completely in its surface portion but remains uncured in its interior. This article is undesirable as a precursor material for the formation of a carbon article. If such a precursor article is fired, decomposition gases evolve from its inside to give a carbon article having cracks or blisters.

In the next step of the process of this invention, the resulting precursor article is fired to carbonize it.

Firing is carried out preferably at a temperature of more than about 450° C., more preferably between about 500° C. and 2,500° C. It is carried out in a non-oxidizing atmosphere, usually in an atmosphere substantially free from molecular oxygen, for example, in an atmosphere consisting mainly of at least one gas selected from nitrogen, helium, hydrogen and carbon monoxide.

The suitable rate of temperature elevation during the carbonization differs according to the thickness or gas-tightness of the precursor article. Generally, low rates of heating are desirable with precursor articles having a large thickness or high gas-tightness. The rate of temperature elevation thus ranges from about 10° C./hour to about 2,000° C./hour.

The firing temperature and atmosphere little affect the properties of the resulting carbon article.

For example, a carbon article having a relatively high specific surface area is obtained when the carbonization is carried out at a temperature of about 700° to about 1,000° C. in an atmosphere of steam, carbon dioxide, a mixture of these, or a mixture of these with the aforesaid non-oxidizing gas.

Carbonization temperatures of about 500° to about 800° C. are suitable for the production of a carbon article having electric conductivity in the range of semi-conductors, and carbonization temperatures of about 800° to about 2,000° C. are suitable for the production of a carbon article having high electrical conductivity which can be conveniently used as a heat exchanger pipe or an electrode.

It will be understood from the foregoing description that according to the process of the invention, whether a carbon article having high strength and hardness is to be obtained as an article having a high or a low density (porous article), as an article having a high or a low specific surface area, or as an article showing the conductivity of a semi-conductor or the conductivity of a conductor depends not only upon the types and proportions of the components of the precursor article, but also upon the molding conditions for the production of the precursor article (for example, for the production of a carbon article having a high density, heat molding under high pressure is desirable), or the carbonization conditions such as the atmosphere and temperature.

The carbon article obtained by the process of this invention is composed substantially of amorphous carbon. This has been determined by the presence of a broad peak near a diffraction angle $2\theta = 23°-24°$ in its X-ray diffraction pattern.

A carbon article produced in accordance with this invention by using the granular or powdery phenol-aldehyde resin, especially the granular or powdery phenol-aldehyde resin (ii) which does not melt or melt-adhere, and another resin as a binder and performing carbonization at relatively low temperatures may sometimes develop a granular or powdery interface when subjected to electro-etching treatment using it as an anode.

The carbon article obtained by the process of this invention has excellent strength and hardness as well as excellent heat resistance, abrasion resistance sliding property or chemical resistance. Hence, the carbon articles obtained by the process of this invention can be suitably used as sliding component parts such as bearings, gears, aircraft brakes and motor brushes; anticorrosive materials such as heat exchangers, Raschig rings and babbler catalyst carriers; heaters such as those for electronic devices and solar houses; heat insulating materials such as heat insulating plates for vacuum furnaces and protecting pipes for high-temperature furnaces; electrodes such as those for sodium hydroxide production, fuel cells and smelting; and electrical and electronic component parts such as semi-conductors and radio reflectors.

Furthermore, they are also useful as abrasive grains or types for typewriters because of their high strength, hardness and abrasion resistance; and as prosthetic bone materials, jigs for analytical instruments or jigs used for working ceramics and glass because of their excellent chemical resistance.

Carbon articles obtained by the present invention which have a high specific surface area, or contain catalytic metals included in situ or after the carbonization are suitably used as filters such as air filters, ozone filters, water filters and oil filters; automobile canisters; and adsorbent materials for solvent recovering devices or catalysts for various chemical reactions. Particularly, carbon articles having a high specific surface area and containing nitrogen has a great ability to adsorb not only hydrocarbon solvents such as benzene but also compounds containing heteroatoms such as pyridine and mercaptan.

The following examples illustrate the present invention more specifically.

The various properties given in these examples were measured by the following methods.

1. Content of particles having a specified particle size:

A portion weighing about 0.1 g was sampled from five different sites of one sample.

A part of each of the 0.1 g portions so sampled was placed on a slide glass for microscopic examination. The sample on the slide glass was spread to minimize accumulation of particles for easy observation.

The microscopic observation was made with regard to that part of the sample in which about 10 to about 50 primary particles and/or the secondary agglomerated particles thereof were present in the visual filed of an optical microscope usually having a magnification of 100 to 1,000. The sizes of all particles existing in the visual field of the optical microscope were read by a measure set in the visual field of the optical microscope and recorded.

The content (%) of particles having a size of, for example, 0.1 to 150µ can be calculated in accordance with the following equation.

$$\text{Content}(\%) = (N_1/N_o) \times 100$$

$N_o$: the total number of particles whose sizes were read in the visual field under the microscope, and
$N_1$: the number of those particles in $N_o$ which had a size of 0.1 to 150µ.

For each sample, the average of values obtained from the five sampled portions was calculated.

2. Proportion of particles which passed through a Tyler mesh sieve:

About 10 g of a dried sample, if desired after lightly crumpled by hand, was accurately weighed. Over the course of 5 minutes the sample was put little by little in a Tyler mesh sieve vibrator (the opening size of the sieve 200 mm in diameter; vibrating speed 200 rpm). After the end of addition, the sieve was vibrated further for 10 minutes. The proportion of the particles which passed through a 100 Tyler mesh sieve, for example, was calculated from the following equation.

$$\text{Proportion (\% by weight)} = \frac{\omega_o - \omega_1}{\omega_o} \times 100$$

$\omega_o$: the amount of the sample put in the sieve (g),
$\omega_1$: the amount of the sample which remained on the 100 Tyler mesh sieve (g).

3. Free phenol content:

About 10 g of the sample which passed through the 100 Tyler mesh sieve was precisely weighed, and heat-treated under reflux for 30 minutes in 190 g of 100% methanol. The hat-treated product was filtered through a No. 3 glass filter. The filtrate was subjected to high-performance liquid chromatography to determine the phenol content of the filtrate. The free phenol content of the sample was determined from a calbiration curve separately prepared.

The operating conditions of high-performance liquid chromatography were as follows:
Device: Model 6000 A made by Waters Co., U.S.A.
Column carrier: µ-Bondapak $C_{18}$
Column: ¼ inch in diameter and 1 foot in length
Column temperature: room temperature
Eluent: methanol/water (3/7 by volume)
Flow rate: 0.5 ml/min.
Detector: UV (254 nm), range 0.01 (1 mV)

The phenol content of the filtrate was determined from a separately prepared calibration curve (showing the relation between the phenol content and the height of a peak based on phenol).

4. Infrared absorption spectrum and absorption intensities (see accompanying FIGS. 1 and 2):

The infrared absorption spectrum of a sample prepared by a usual KBr tablet method was measued by means of an infrared spectrophotometer (Model 225 made by Hitachi Limited).

The absorption intensity at a specified wavelength was determined in the following way.

A base line is drawn tangent to a peak whose absorption intensity is to be determined in the measured infrared absorption spectral chart. Let the transmittance of the vertex of the peak be $t_p$ and the transmittance of the base line at the specified wavelength be $t_b$, then the absorption intensity D at the specified wavelength is given by the following equation.

$$D = \log(t_b/t_p)$$

For example, the ratio of the absorption intensity of a peak at 890 $cm^{-1}$ to that of a peak at 1600 $cm^{-1}$ is given by the ratio of the respective absorption intensities determined by the above equation (i.e., $D_{890}/D_{1600}$).

5. Heat fusibility at 100° C.:

About 5 g of a sample which passed through a 100 Tyler mesh sieve was interposed between two 0.2 mm-thick stainless steel sheets, and the assembly was pressed under an initial pressure of 50 kg for 5 minutes by means of a hot press kept at 100° C. (a single acting compression molding machine manufactured by Shinto Kinzoku Kogyosho Co., Ltd.). The press was released, and the hot-pressed sample was taken out from between the two stainless steel sheets, and observed. When the sample so taken out was in the form of a flat plate as a result of melting or melt-adhesion, it was judged that the sample had fusibility. When no appreciable difference was noted after the hot pressing, the sample was determined to have infusibility.

6. Methanol solubility:

About 10 g of a sample was precisely weighed (the precisely measured weight is given by $W_o$), and heat-treated under reflux for 30 minutes in about 500 ml of 100% methanol. The mixture was filtered on a No. 3 glass filter. The sample remaining on the filter was washed with about 100 ml of methanol. Then, the sample remaining on the filter was dried at 70° C. for 2 hours. The weight of the dried sample was precisely weighed (the precisely measured weight is given by $W_1$). The solubility of the sample in methanol was calculated from the following equation.

$$\text{Solubility in methanol (wt \%)} = \frac{W_o - W_1}{W_o} \times 100$$

7. Bulk density:

A sample was poured into a 100 ml measuring cylinder (whose brim corresponded to a 150 ml indicator mark) from a height 2 cm above the brim of the measuring cylinder. The bulk density of the sample is defined by the following equation.

Bulk density (g/ml) = $W$(g)/100(ml)

W: the weight in grams of the sample per 100 ml.

8. Hydroxyl value:

Measured in accordance with the method of measuring the hydroxyl value (General Testing Method 377, Commentary on the Standards of Cosmetic Materials, first edition, published by Yakuji Nipposha, 1975).

9. Density of the carbon article:

The density of a pulverized sample was measured by using a liquid having the same specific gravity.

10. Hardness of the carbon article:

Measured under a load of 500 kg by a Vickers microhardness tester.

11. Flexural strength of the carbon article:

Measured substantially in accordance with JIS K-6911.

12. Gas permeability of the carbon article:

Measured by the volume changing method using a device modelled after ASTM-1434 and a helium gas.

13. Heat resistance of the carbon article:

The temperature at which the weight loss of the sample began was measured by using a TGA device in which the temperature was elevated at a rate of 5° C./min. in the air.

14. X-ray diffraction pattern of the carbon article:

The sample was pulverized by a tungsten carbide disk-type pulverizing device, and its X-ray diffraction pattern was determined by a diffractometer through a nickel filter using CuKα radiation.

15. Specific electrical resistance of the carbon article:

Measured by the voltage decreasing method in accordance with JIS R-7202.

REFERENTIAL EXAMPLE 1

(1) In each run, a 2-liter separable flask was charged with 1,500 g of a mixed aqueous solution at 25° C. of hydrochloric acid and formaldehyde having each of the compositions shown in Table 1, and 62.5 g of an aqueous solution at 25° C. containing 80% by weight of phenol and 5% by weight of formaldehyde prepared from 98% by weight of phenol (the remaining 2% by weight being water), 37% formalin and water was added. The mixture was stirred for 20 seconds, and then left to stand for 60 minutes. During the 60-minute standing, the contents of the flask remained clear (Runs Nos. 1 and 20), or turned from a clear solution to a whitely turbid suspension (Runs Nos. 3, 9 and 18), or turned from a clear solution to a whitely turbid suspension which then turned pale pink (Runs Nos. 2, 4 to 8, 10 to 17, and 19). Microscopic observation showed that the pink-colored suspensions already contained spherical particles, agglomerated spherical particles, and a small amount of a powder. With occasional stirring, the contents of the separable flask were heated to 80° C. over the course of 60 minutes, and then maintained at 80° to 82° C. for 15 minutes to obtain a reaction product. The reaction product was washed with warm water at 40° to 45° C., treated in a mixed aqueous solution containing 0.5% by weight of ammonia and 50% by weight of methanol at 60° C. for 30 minutes, again washed with warm water at 40° to 45° C., and then dried at 80° C. for 2 hours. The properties of the reaction products obtained by using the aqueous solutions of hydrochloric acid and formaldehyde in various proportions are shown in Table 2.

(2) For comparison, the following experiment was carried out. A 1-liter separable flask was charged with 282 g of distilled phenol, 369 g of 37% by weight formalin and 150 g of 26% by weight aqueous ammonia and with stirring, the mixture was heated from room temperature to 70° C. over 60 minutes. Furthermore, the mixture was stirred at 70° to 72° C. for 90 minutes, and then allowed to cool. While 300 g of methanol was added little by little, the product was dehydrated by azeotropic distillation under a reduced pressure of 40 mmHg. As a solvent, 700 g of methanol was added, and the product was withdrawn as a yellowish brown clear solution of a resol resin.

When the solvent was removed from a part of the resulting resol resin under reduced pressure, vigorous foaming occurred and the resin was gelled. The gel was heat-cured under a nitrogen gas atmosphere at 160° C. for 60 minutes, and the resulting cured foam was pulverized to obtain a small amount of a powder which passed through a 100 Tyler mesh sieve. The heat-cured resol was very hard and extremely difficult to pulverize into a powder having a size of 100-mesh under even when various types of pulverizers or ball mills or a vibratory mill for fluorescent X-rays were used. The resulting heat-cured resol resin powder was treated with a mixed aqueous solution containing 0.5% by weight of ammonia and 50% by weight of methanol, washed with warm water, dehydrated and then dried under the same conditions as described in section (1) above. The properties of the resulting product are shown in Table 2 as Run No. 21.

A 1-liter separable flask was charged with 390 g of phenol, 370 g of 37% by weight formalin, 1.5 g of oxalic acid and 390 g of water, and with stirring, the mixture was heated to 90° C. over 60 minutes and heated with stirring at 90° to 92° C. for 60 minutes. Then, 1.0 g of 35% by weight hydrochloric acid was added, and the mixture was further heated with stirring at 90° to 92° C. for 60 minutes. The product was cooled by adding 500 g of water, and then the water was removed by a siphon. The residue was heated under a reduced pressure of 30 mmHg, and heated under reduced pressure at 100° C. for 3 hours and then at 180° C. for 3 hours. On cooling, a novolak resin was obtained as a yellowish brown solid having a softening temperature of 78° to 80° C. and a free phenol content, measured by liquid chromatography, of 0.76% by weight. It had a methanol solubility of 100% by weight.

The resulting novolak resin was pulverized and mixed with 15% by weight of hexamethylenetetramine. The mixture was heat-cured in a nitrogen gas at 160° C. for 120 minutes, pulverized in a ball mill, and then passed through a 100 Tyler mesh sieve. The resulting powder was treated with a mixed aqueous solution containing 0.5% by weight of ammonia and 50% by weight of methanol, washed with water, dehydrated and then dried under the same conditions as described above. The properties of the resulting product are shown in Table 2 as Run No. 22.

The novolak resin was melt-spun at 136° to 138° C. through a spinneret having 120 orifices with a diameter of 0.25 mm. The as-spun filaments having an average size of 2.1 denier were dipped in a mixed aqueous solution 1.8% by weight of hydrochloric acid and 18% by weight of formaldehyde at 20° to 21° C. for 60 minutes, heated to 97° C. over 5 hours, and then maintained at 97° to 98° C. for 10 hours. The resulting cured novolak fibers were treated with a mixed aqueous solution containing 0.5% by weight of ammonia and 50% by weight of methanol, washed with water, dehydrated and then dried under the same conditions as described above. The product was pulverized in a ball mill, and passed through a 100 Tyler mesh sieve. The properties of the resulting product are shown in Table 2 as Run No. 23.

(3) Table 1 shows the concentrations of hydrochloric acid and formaldehyde used and the total concentration of hydrochloric acid and formaldehyde, and the mole ratio of formaldehyde to phenol. Table 2 shows the contents of particles having a size of 1 to 50 microns, 1 to 100 microns, and 1 to 150 microns, respectively, the proportion of particles which passed through a 100 Tyler mesh sieve, and the $D_{990-1015}/D_{1600}$ and $D_{890}/D_{1600}$ ratios of the resulting products.

TABLE 1

| Run No. | Concentration (wt. %) HCl | Concentration (wt. %) Formaldehyde | Concentration (wt. %) Total | Mole ratio of formaldehyde to phenol |
|---|---|---|---|---|
| 1 | 3 | 1 | 4 | 1.1 |
| 2 | 3 | 25 | 28 | 23.8 |
| 3 | 5 | 5 | 10 | 4.9 |
| 4 | 5 | 10 | 15 | 9.6 |
| 5 | 5 | 22 | 27 | 20.9 |
| 6 | 7 | 30 | 37 | 28.5 |
| 7 | 10 | 6 | 16 | 5.8 |
| 8 | 10 | 20 | 30 | 19.1 |
| 9 | 12 | 3 | 15 | 2.8 |
| 10 | 15 | 5 | 20 | 4.9 |
| 11 | 15 | 25 | 40 | 23.8 |
| 12 | 18 | 10 | 28 | 9.6 |
| 13 | 20 | 7 | 27 | 16.8 |
| 14 | 22 | 4 | 26 | 4.0 |
| 15 | 22 | 17 | 39 | 16.2 |
| 16 | 25 | 6 | 31 | 5.8 |
| 17 | 25 | 25 | 50 | 23.8 |
| 18 | 28 | 3 | 31 | 2.8 |
| 19 | 28 | 7 | 35 | 6.8 |
| 20 | 33 | 1 | 34 | 1.1 |
| 21 | Heat cured resol resin | | | |
| 22 | Hexamine heat-cured novolak resin | | | |
| 23 | Cured novolak Fibers | | | |

TABLE 2

| Run No. | Content (%) of particles having the following sizes 1–50μ | Content (%) of particles having the following sizes 1–100μ | Content (%) of particles having the following sizes 1–150μ | Proportion of particles having a size of 100 mesh under (wt. %) | IR intensity ratio $D_{990-1015}/D_{1600}$ | IR intensity ratio $D_{890}/D_{1600}$ |
|---|---|---|---|---|---|---|
| 1 | 1 (76) | 1 (100) | 1 (100) | 1 (83) | 0.35 | 0.10 |
| 2 | 3 (73) | 3 (100) | 3 (100) | 4 (79) | 0.45 | 0.11 |
| 3 | 13 (87) | 13 (100) | 13 (100) | 8 (75) | 0.42 | 0.11 |
| 4 | 50 | 89 | 96 | 62 | 0.86 | 0.18 |
| 5 | 53 | 97 | 100 | 63 | 4.82 | 0.73 |
| 6 | 12 (76) | 12 (100) | 12 (100) | 18 (84) | 6.68 | 1.02 |
| 7 | 61 | 98 | 100 | 63 | 0.23 | 0.10 |
| 8 | 83 | 100 | 100 | 78 | 2.36 | 0.58 |
| 9 | 61 | 92 | 100 | 61 | 0.21 | 0.14 |
| 10 | 83 | 100 | 100 | 76 | 0.25 | 0.11 |
| 11 | 63 | 81 | 100 | 61 | 4.83 | 0.46 |
| 12 | 99 | 100 | 100 | 98 | 1.52 | 0.40 |
| 13 | 99 | 100 | 100 | 91 | 0.83 | 0.25 |
| 14 | 69 | 94 | 100 | 69 | 0.26 | 0.17 |
| 15 | 54 | 75 | 92 | 71 | 2.16 | 0.64 |
| 16 | 84 | 98 | 100 | 79 | 0.37 | 0.12 |
| 17 | 10 (86) | 10 (94) | 10 (100) | 2 (73) | 4.26 | 0.13 |
| 18 | 50 | 87 | 96 | 62 | 0.27 | 0.10 |
| 19 | 59 | 93 | 100 | 69 | 0.44 | 0.10 |
| 20 | 2 (52) | 2 (95) | 2 (100) | 1 (61) | 0.23 | 0.10 |
| 21 | 17 | — | — | — | 0.12 | 0.09 |
| 22 | 58 | — | — | — | 5.47 | 0.07 |
| 23 | 39 | — | — | — | 0.87 | 0.23 |

In Runs Nos. 1, 2, 3, 6, 17 abd 20 shown in Table 1, a large amount of a sticky resin or a hard and large lumpy or plate-like mass formed at the bottom of the separable flask. In Runs Nos. 1, 2 and 20, only less than 49 g of a solid was obtained from 50 g of phenol used.

In Runs Nos. 1, 2, 3, 6, 17 and 20, the contents of particles having a size of 1 to 50 microns, 1 to 100 microns and 1 to 150 microns and the proportion of particles having a size of 100 mesh under shown in Table 2 are based on the entire solid including the sticky resin, lumpy mass and plate-like mass. The contents of these particles and the proportion of particles having a size of 100 mesh under based only on the granular and powdery product in these Runs are shown in the parentheses in Table 2.

REFERENTIAL EXAMPLE 2

Each of six 20-liter reaction vessels was charged with 10.24 to 11.65 kg of a mixed aqueous solution containing 20% by weight of hydrochloric acid and 11% by weight of formaldehyde so that the bath ratio was as shown in Table 3. With stirring at 23° C., a mixed aqueous solution containing 90% by weight of phenol and 3.7% by weight of formaldehyde was added in an amount of 1.8 kg, 1.5 kg, 0.9 kg, 0.7 kg, 0.4 kg, and 0.25 kg, respectively. The bath ratios were 7.3, 8.5, 13.5, 17.0, 28.9, and 45.6, respectively.

In all of these cases, continued stirring after addition of the mixed aqueous phenol solution resulted in the abrupt formation of white suspended particles in 40 to 120 seconds. The stirring was stopped as soon as the white suspended particles formed, and the suspension was left to stand for 3 hours. The temperature of the inside of the reaction system gradually rose, and the contents of the vessel gradually turned pale pink. In all of these runs, the formation of a slurry-like or resin-like product was observed in 30 minutes after the formation of the white suspended particles. The reaction mixture was washed with water with stirring. With stirring, the contents of the flask were heated to 75° C. over 2 hours, and then heated with stirring at 75° to 76° C. for 30 minutes. With the reaction mixture obtained in a system having a bath ratio of 7.3, a large amount of resin melt-adhered to the stirring rod and the stirring became very difficult. In all runs, the contents of the reaction vessel turned from pale pink to pink and further to red during the temperature elevation.

The contents of the flask were then washed with water, treated in a mixed aqueous solution containing 0.1% by weight of ammonia and 55% by weight of methanol at 50° C. for 60 minutes, and washed with warm water at 80° C. for 60 minutes. The resulting granular or powdery product or lumpy mass was crumpled lightly by hand, and dried at 100° C. for 2 hours. After the drying, the product had a water content of less than 0.2% by weight. The resulting products are designated as samples of Runs Nos. 31, 32, 33, 34, 35 and 36 in the increasing order of the bath ratio.

Table 3 summarizes the maximum temperature reached of the reaction system from the initiation of the reaction to 3 hours after the formation of the white suspended particles; the yield of the reaction product; the presence of absence of spherical primary particles by microscopic observation; the proportion and bulk density of particles having a size of 100 Tyler mesh under in the reaction product; the heat fusibility at 100° C. of the reaction product; the elemental analysis values of the product; and the OH value of the product.

TABLE 3

| Run No. | Bath ratio | Maximum temperature reached of the reaction system (°C.) | Yield (wt. %) | Proportion of the 100 mesh under particles (wt. %) | Bulk density of the 100 mesh under particles | Presence or absence of spherical primary particles | Heat-fusibility at 100° C. | Elemental analysis (wt. %) C | H | O | N | OH value |
|---|---|---|---|---|---|---|---|---|---|---|---|---|
| 31 | 7.3 | 39.5 | 110 | 29 | 0.25 | Little | Fused | 74.5 | 5.7 | 19.0 | 0.6 | 330 |
| 32 | 8.5 | 38.5 | 113 | 63 | 0.23 | Much | Infusible | 74.7 | 5.6 | 19.3 | 0.3 | 335 |
| 33 | 13.5 | 37.0 | 115 | 78 | 0.21 | Mostly | " | 75.0 | 5.7 | 20.0 | 0.2 | 360 |
| 34 | 17.0 | 36.5 | 118 | 91 | 0.20 | " | " | 75.1 | 5.7 | 19.1 | 0.1 | 373 |
| 35 | 28.9 | 35.5 | 118 | 98 | 0.19 | " | " | 76.3 | 5.7 | 18.7 | 0.0 | 385 |
| 36 | 45.6 | 35.0 | 117 | 97 | 0.19 | " | " | 75.7 | 5.7 | 18.3 | 0.0 | 377 |
| 21 | (Comparison; see Table 1) | | — | — | 0.67 | None | " | 78.7 | 5.7 | 14.7 | 0.7 | 235 |
| 22 | (Comparison; see Table 1) | | — | — | 0.50 | " | Fused | 78.1 | 6.0 | 13.7 | 2.3 | — |
| 23 | (Comparison; see Table 1) | | — | — | 0.27 | " | Infusible | 74.8 | 5.6 | 19.2 | 0.5 | 325 |

The OH value of the product obtained in Run No. 22 could not be measured because it fluctuated greatly.

In Run No. 31, a plate-like product and a lumpy product formed in a total amount of as large as about 70% based on the entire solid formed at the bottom of the flask, and only about 30% of the entire solid consisted of a granular or powdery product. But about 95% of the granular or powdery product passed through a 100 Tyler mesh sieve. The indication "little" for Run No. 31 is because the proportion of the granular or powdery product based on the entire solid was as small as about 30%. Hence, the method of Run No. 31 is not recommendable, but the resulting granular or powdery product is included within the granular or powdery resin used in this invention.

In Runs Nos. 31 to 36, almost all of the granular or powdery product consisted of particles having a size of 1 to 100 microns.

Referential Example 3

One thousand grams of a mixed aqueous solution at 25° C. containing 18% by weight of hydrochloric acid and 9% by weight of formaldehyde was put into each of six 1-liter separable flasks. The room temperature was 15° C. With stirring, 40 g of phenol diluted with 5 g of water was added at a time to the solution. In each run, the stirring was stopped in 50 seconds after the addition of the diluted solution of phenol. In 62 to 65 seconds after the stopping of the stirring, white suspended particles abruptly formed to give a milk-white product. The milk-white product gradually turned pink. The temperature of the liquid gradually rose from 25° C., reached a maximum temperature of 35° to 36° C. in 16 to 17 minutes after the addition, and then dropped. The reaction mixture was allowed to stand at room temperature for 0.5 hour (Run No. 41), 1 hour (Run No. 42), 2 hours (Run No. 43), 6 hours (Run No. 44), 24 hours (Run No. 45), and 72 hours (Run No. 46), respectively, washed with water, treated in 1% by weight aqueous ammonia at 15° to 17° C. for 6 hours, washed with water, dehydrated, and finally dried at 40° C. for 6 hours.

Table 4 summarizes the proportion of particles which passed through a 100 Tyler mesh sieve, the $D_{990-1015}/D_{1600}$ ratio and $D_{890}/D_{1600}$ ratios, the methanol solubility and the free phenol content of the products.

The samples obtained in Runs Nos. 41 to 46 all fused in a heat fusibility test conducted at 100° C. for 5 minutes.

FIG. 1 shows an infrared absorption spectral chart of the granular or powdery resin obtained in Run No. 44. FIG. 2 also illustrates the method of determining $t_p$ to $t_b$ required for obtaining the absorption intensity D. A base line is drawn across a certain peak, and $t_p$ and $t_b$ can be determined as illustrated at the wavelength of the peak.

TABLE 4

| Run No. | Proportion of particles which passed through a 100 Tyler mesh sieve (wt. %) | IR intensity ratio $D_{990-1015}/D_{1600}$ | $D_{890}/D_{1600}$ | Methanol solubility (wt. %) | Free phenol content (ppm) |
|---|---|---|---|---|---|
| 41 | 59 | 0.53 | 0.10 | 97 | 310 |
| 42 | 83 | 0.87 | 0.12 | 80 | 116 |
| 43 | 94 | 1.06 | 0.13 | 71 | 85 |
| 44 | 97 | 1.12 | 0.13 | 67 | 74 |
| 45 | 96 | 1.12 | 0.14 | 64 | 73 |
| 46 | 97 | 1.13 | 0.13 | 63 | 70 | with water, and dehydrated to give 44.6 kg of the reaction product having a water content of 15% by weight.

2.0 Kg of the reaction product so obtained was dried at 40° C. for 3 hours to give 1.7 kg of a sample (Run No. 47).

Table 5 shows the contents of 0.1-50 micron particles and 0.1-100 micron particles of the dried sample obtained, the proportion of particles which passed through a 100 mesh Tyler mesh sieve, the $D_{990-1015}/D_{1600}$ and $D_{890}/D_{1600}$ ratios, and the methanol solubility of the product.

TABLE 5

| Run No. | Content of 0.1-50 micron particles (%) | Content of 0.1-100 micron particles (%) | Proportion of particles which passed through a 100 Tyler mesh sieve (wt. %) | IR intensity ratio $D_{990-1015}/D_{1600}$ | $D_{890}/D_{1600}$ | Methanol solubility (wt. %) |
|---|---|---|---|---|---|---|
| 47 | 96 | 100 | 99 | 1.18 | 0.13 | 47 |

EXAMPLE 1

One hundred grams of the product of Run No. 12 (as a filler) and 100 g, as solids of the uncured resol resin used in Run No. 21 were mixed. The resin mixture was dried at room temperature for a day and night, and then dried at 80° C. for 30 minutes in an oven dryer. A predetermined amount of the dried mixture was treated under a pressure of 200 kg/cm² for 30 minutes in a mold kept at 150° C. to prepare five molded articles having a width of 20 mm, a thickness of 3 mm and a length of 120 mm.

As controls, each of the products (cured products) obtained in Runs Nos. 21 to 23 or each of wood flour, carbon black and silica powder which had been passed through a 100 Tyler mesh sieve was mixed in equal amounts with the resol resin used in Run No. 21. The mixture was molded in the same way as above to prepare five molded articles (precursors) having a width of 20 mm, a thickness of about 3 mm and a length of 120 mm.

Each of the precursor articles was heated to 1000° C. at a rate of 30° C./hour in a stream of nitrogen gas, and maintained at this temperature for 60 minutes. Then, the fired product was gradually cooled to give a carbonized product.

Table 6 shows the kinds of the fillers used, the percent retention of the length of each carbonized product based on that of the precursor, the carbonization yield (based on the precursor), and the Vickers hardness, gas permeability and flexural strength of each products.

REFERENTIAL EXAMPLE 4

A 1000-liter reaction vessel equipped with a stirring rod was charged with 800 kg of a mixed aqueous solution at 18° C. containing 18.5% by weight of hydrochloric acid and 8.5% by weight of formaldehyde, and while the mixed aqueous solution was stirred, 36.4 kg of a 88% by weight aqueous solution of phenol at 20° C. was added. After the addition of all of the aqueous phenol solution, the mixture was stirred for 60 seconds. The stirring was then stopped, and the mixture was left to stand for 2 hours. In the reaction vessel, white suspended particles formed abruptly in 85 seconds after the addition of all of the aqueous phenol solution. The white suspended particles gradually turned pale pink, and the temperature of the suspension gradually rose to 34.5° C. and decreased. Thereafter, while the mixed aqueous solution in which the reaction product formed was stirred, a valve secured to the bottom of the reaction vessel was opened, and the contents were withdrawn and separated into the reaction product and the mixed aqueous solution of hydrochloric acid and formaldehyde by using a nonwoven fabric (Nomex, a tradename for a product of E. I. du Pont de Nemours & Co.). The reaction product was washed with water, dehydrated, dipped for a day and night in a 0.5% by weight aqueous solution of ammonia at 18° C., again washed

TABLE 6

| Run No. | Type of the filler | Carbonized product Percent retention of the length (%) | Carbonization yield (wt. %) | Hardness (kg/mm$^2$) | Gas permeability (cm$^2$/sec) | Flexural strength (kg/cm$^2$) |
|---|---|---|---|---|---|---|
| 51 | Product of Run No. 12 | 81.2 | 68.7 | 1,070 | $5 \times 10^{-10}$ | 1,100 |
| 52 | Product of Run No. 21 | Difficult to measure | 62.4 | 610 | 200< | 100> |
| 53 | Product of Run No. 22 | Difficult to measure | 59.7 | 430 | 200< | 100> |
| 54 | Product of Run No. 23 | 81.3 | 68.3 | 1,020 | $8 \times 10^{-9}$ | 1,050 |
| 55 | Wood flour | Difficult to measure | 47.1 | 360 | $10^{-3}$< | 100> |
| 56 | Carbon black | 94.7 | 72.4 | 310 | $10^{-3}$< | 100> |
| 57 | Silica | 97.3 | 73.3 | 230 | $10^{-3}$< | 100> |

In Table 6, the carbonized products obtained in Runs Nos. 52, 53 and 55 developed cracks and/or gas blisters and were either warped or destroyed, and the percent retention of their lengths was difficult to measure. Furthermore, their hardnesses greatly varied.

EXAMPLE 2

The product of Run No. 42 (as a filler) and the resol resin (uncured) used in Run No. 21 were mixed in various proportions (Runs Nos. 61 to 68). Each of the mixtures was air dried at room temperature for 24 hours, and then dried at 60° C. for 60 minutes. About 50 g of the mixture was divided in ten equal portions, and treated under a pressure of 300 kg/cm$^2$ for 20 minutes in molds heated in advance to 150° C. between hot presses to prepare ten molded articles each having a width of 13 mm, a thickness of 3.2 to 3.4 mm and a length of 100 mm. The molded articles were each heated to 100° C. from room temperature over 30 minutes in a stream of nitrogen gas, then maintained at this temperature for 30 minutes, again heated to 1500° C. over 50 hours, and maintained at this temperature for 2 hours. While nitrogen gas was further caused to flow, the product was allowed to cool for 12 hours to give a carbonized product.

Table 7 summarizes the mixing ratio of the product of Run No. 42 and the resol resin (as solids), the appearance and density of the precursor, the number of carbonized products whose cracks or gas blisters were not markedly observed (good acceptable articles) per 10 samples, and the density, carbonization yield, flexural strength and specific electrical resistance of each good acceptable product.

Since no good product was obtained in Run No. 61, only the density and carbonization yield are shown.

In all of the carbonized products, a vitreous gloss was observed at the fractured surface, and a broad peak was noted at 23° to 24° in their X-ray diffraction patterns.

TABLE 7

| Run No. | Mixing proportions (wt. %) of the product of Run No. 42/resol resin | Precursor Appearance | Precursor Density | Number of good products per 10 | Carbonized product Density | Carbonization yield (wt. %) | Flexural strength (kg/cm$^2$) | Specific electrical resistance ($\times 10^{-3}$ Ω-cm) |
|---|---|---|---|---|---|---|---|---|
| 61 | 0/100 | Blisters formed | 0.87 | 0 | 1.03 | 54.1 | — | — |
| 62 | 5/95 | Blisters formed | 1.01 | 2 | 1.21 | 54.9 | 460 | 8.6 |
| 63 | 15/85 | Good | 1.18 | 6 | 1.43 | 62.1 | 780 | 5.8 |
| 64 | 25/75 | " | 1.20 | 8 | 1.42 | 64.8 | 1,170 | 5.2 |
| 65 | 35/65 | " | 1.21 | 10 | 1.44 | 66.6 | 1,010 | 5.7 |
| 66 | 50/50 | " | 1.21 | 10 | 1.48 | 67.7 | 1,210 | 4.8 |
| 67 | 80/20 | " | 1.20 | 9 | 1.43 | 68.5 | 1,130 | 5.4 |
| 68 | 100/0 | " | 1.19 | 10 | 1.41 | 67.5 | 1,080 | 5.9 |

EXAMPLE 3

Forty-five precursor samples composed of 40 parts by weight of the product of Run No. 35 (as a filler) and 60 parts by weight of the resol resin used in Run No. 21 (uncured; as solids) were prepared in the same way as in Example 2. Five samples were each heated in a stream of helium gas from room temperature at a rate of 40° C./hour to 350° C./hour (Run No. 71), 450° C. (Run No. 72), 550° C. (Run No. 73), 650° C. (Run No. 74), 800° C. (Run No. 75), 1000° C. (Run No. 76), 1500° C. (Run No. 77), 1800° C. (Run No. 78), or 2100° C. (Run No. 79), maintained at each of the temperatures (carbonization temperatures) for 3 hours, and allowed to cool.

Table 8 summarizes the carbon contents (determined by elemental analysis), densities, flexural strengths, specific electrical resistance and X-ray diffraction angles of the carbonized products obtained.

TABLE 8

| Run No. | Carbonization temperature (°C.) | Carbon content (wt. %) | Density | Flexural Strength (kg/cm$^2$) | Specific electrical resistance (Ω-cm) | X-ray diffraction angle (°) |
|---|---|---|---|---|---|---|
| 71 | 350 | 82.6 | 1.29 | 480 | 10$^{14}$ | Not discernible |
| 72 | 450 | 87.7 | 1.36 | 630 | 10$^3$ | " |
| 73 | 550 | 90.2 | 1.39 | 720 | 10$^1$ | 23 (Very broad) |
| 74 | 650 | 92.8 | 1.43 | 860 | 0.1 | 23 (Broad) |
| 75 | 800 | 94.5 | 1.50 | 1,150 | 0.02 | 23 (Broad) |
| 76 | 1,000 | 95.4 | 1.51 | 1,210 | 0.02 | 23 (Broad) |
| 77 | 1,500 | 96.7 | 1.48 | 1,190 | 0.01 | 23 (Broad) |
| 78 | 1,800 | 99.4 | 1.46 | 1,020 | 0.01 | 23.5 (Broad) |
| 79 | 2,100 | 99.6 | 1.42 | 880 | 0.01 | 24.5 (Broad) |

EXAMPLE 4

Fifty parts by weight of the product of Run No. 34 (as a filler) was mixed with 50 parts of each of the uncured resol resin used in Run No. 21, the novolak resin obtained in Run No. 22 (containing 10% by weight of hexamethylenetetramine), the product of Run No. 44 (heat-fused product), the product of Run No. 47 (heat-fused product), a furan resin (Hitafuran-303, a tradename for a product of Hitachi Chemical Co., Ltd.), an epoxy resin (Epikote 815, a tradename for a product of Shell Chemical Co.), or coal tar pitch (having a softening point of 125° C. and containing 13.6% by weight of a quinoline-insoluble material; a product of Allied Chemical Corporation) in accordance with the method described in Example 2.

The mixture (2.5 g) was molded in the same way as in Example 2, and 10 molded products (precursors) having a width of 13 mm, a thickness of 1.5 to 1.7 mm and a length of 100 mm were prepared.

Each of the precursor articles was heated in a stream of nitrogen gas gradually from room temperature to 1000° C., over 24 hours, maintained at this temperature for 60 minutes, and allowed to cool.

Table 9 summarizes the number of carbonized products (good acceptable products) free from cracks or gas blisters per 10 samples, and the carbonization yields and flexural strengths of the good products.

TABLE 9

| | | Carbonized products | | |
|---|---|---|---|---|
| Run No. | Kind of the resin | Acceptable products per 10 samples | Carbonization yield (wt. %) | Flexural strength (kg/cm$^2$) |
| 81 | Product of Run No. 21 | 10 | 67.4 | 1210 |
| 82 | Product of Run No. 22 | 7 | 68.6 | 870 |
| 83 | Product of Run No. 44 | 10 | 69.5 | 1020 |
| 84 | Product of Run No. 47 | 10 | 69.1 | 1150 |
| 85 | Furan resin | 9 | 65.7 | 1050 |
| 86 | Epoxy resin | 6 | 56.7 | 830 |
| 87 | Coal tar pitch | 7 | 84.6 | 860 |

EXAMPLE 5

Five mixtures (Runs Nos. 91 to 95) were prepared from 60 parts by weight of the product of Run No. 43 and 40 parts by weight of the product of Run No. 36, coconut shell powder having a size of 100 Tyler mesh under obtained by heat-treating coconut shell in a nitrogen atmosphere at 500° C. and pulverizing it, wheat flour having a size of 100 Tyler mesh under, polyvinyl alcohol having a size of 100 Tyler mesh under, or silica powder having a size of 100 Tyler mesh under. Each of these mixtures or the product of Run No. 43 (Run No. 96) alone was extruded into a rope having a diameter of 2 to 3 mm at a temperature of 150° C. through a small-sized extruder (Type 3AGM, made by Sumitomo Heavy Industries, Ltd.). The extrudate was cooled with water and cut to pieces having a length of about 10 mm. The cut products were each dried at 80° C. for 5 hours to form precursor articles.

While steam-containing nitrogen obtained by passing nitrogen through hot water at 80° C. was continuously sent to each of the precursors, it was heated to 900° C. from room temperature over 60 minutes, then maintained at this temperature for 30 minutes, cooled, and withdrawn.

Table 10 summarizes the proportions and kinds of the materials used, the carbonization yields of the carbonized products (based on the precursors), and the apparent densities and specific surface areas (BET method using N$_2$) of the carbonized products, and the amount of benzene adsorbed to saturation at 20° C. to the carbonized products.

TABLE 10

| | | Carbonized product | | | |
|---|---|---|---|---|---|
| Run No. | Proportions of the materials used (the product of Run No. 43/the filler) | Yield (wt. %) | Apparent density (g/cc) | Specific surface area (m$^2$/g) | Amount of benzene adsorbed (g/g) |
| 91 | 60/40 of the product of Run No. 40 | 55 | 0.67 | 630 | 0.20 |
| 92 | 60/40 of the coconut shell powder | 41 | 0.49 | 810 | 0.26 |
| 93 | 60/40 of wheat flour | 42 | 0.54 | 670 | 0.21 |
| 94 | 60/40 of polyvinyl alcohol | 36 | 0.36 | 740 | 0.23 |
| 95 | 60/silica 40 | 71 | 1.36 | 160 | 0.07 |
| 96 | 100/0 | 58 | 0.72 | 440 | 0.12 |

REFERENTIAL EXAMPLE 5

(1) A 2-liter separable flask was charged with 1.5 kg of a mixed aqueous solution at 25° C. of hydrochloric acid and formaldehyde in the various concentrations shown in Table 11, and while the mixed aqueous solution was stirred, 125 g of a mixed aqueous solution at 25° C. containing 20% by weight of phenol, 20% by weight of urea and 14.6% by weight of formaldehyde prepared from 98% phenol (the remaining 2& by weight being water), urea, 37% by weight formalin and water was added. The mixture was then stirred for 15 seconds, and thereafter left to stand for 60 minutes. During the 60- minute standing, the contents of the separable flask remained clear (Runs Nos. 101 and 120 in Table 11), or turned from a clear solution to a whitely turbid suspension and remained whitely turbid (Runs Nos. 103, 109 and 118 in Table 11), or turned from a clear solution to a whitely turbid suspension and gave a white precipitate (Runs Nos. 102, 104–108, 110–117, and 119). By microscopic observation, this white precipitate was found to contain spherical particles, an agglomerated mass of spherical particles, and a small amount of a powder. Then, with occasional stirring, the contents of the separable flask were heated to 80° C. over 60 minutes and then maintained at 80° to 82° C. for 15 minutes to obtain a reaction product. The reaction product was washed with warm water at 40° to 45° C., treated at 60° C. for 30 minutes in a mixed aqueous solution containing 0.5% by weight of ammonia and 50% by weight of methanol, again washed with warm water at 40° to 45° C., and then dried at 80° C. for 2 hours. The properties of the reaction products are shown in Table 12.

(2) Table 11 summarizes the concentrations of hydrochloric acid and formaldehyde used, the total concentration of hydrochloric acid and formaldehyde, the proportion of the weight of the HCl-formaldehyde solution based on the total weight of the phenol and urea, and the mole ratio of formaldehyde to phenol+urea. Table 12 summarizes the contents of particles having a size of 0.1 to 50 microns and 0.1 to 100 microns respectively, the amount of particles which passed through a 150 Tyler mesh sieve, and the $D_{960-1020}/D_{1450-1500}$, $D_{1280-1360}/D_{1450-1500}$ and $D_{1580-1650}/D_{1450-1500}$ ratios of the resulting products.

TABLE 11

| Run No. | Concentrations of the HCl-formaldehyde (wt. %) | | | Proportion of the weight of the HCl—HCHO bath based on the total amount of phenol and urea (wt. %) | | Mole ratio of total HCHO to the mixture of phenol and urea |
|---|---|---|---|---|---|---|
| | HCl | HCHO | Total | HCl | HCHO | |
| 101 | 3 | 1 | 4 | 90 | 30 | 1.6 |
| 102 | 3 | 28 | 31 | 90 | 840 | 21.2 |
| 103 | 5 | 2 | 7 | 150 | 60 | 2.3 |
| 104 | 5 | 10 | 15 | 150 | 310 | 8.1 |
| 105 | 5 | 22 | 27 | 150 | 660 | 16.8 |
| 106 | 7 | 30 | 37 | 210 | 900 | 22.6 |
| 107 | 10 | 7 | 17 | 300 | 210 | 5.9 |
| 108 | 10 | 18 | 28 | 300 | 540 | 13.9 |
| 109 | 12 | 3 | 15 | 360 | 90 | 3.0 |
| 110 | 15 | 5 | 20 | 450 | 150 | 4.5 |
| 111 | 15 | 22 | 37 | 450 | 660 | 16.8 |
| 112 | 18 | 10 | 28 | 540 | 300 | 8.1 |
| 113 | 20 | 7 | 27 | 600 | 210 | 5.9 |
| 114 | 22 | 4 | 26 | 660 | 120 | 3.8 |
| 115 | 22 | 17 | 39 | 660 | 510 | 13.2 |
| 116 | 25 | 6 | 31 | 750 | 180 | 5.2 |
| 117 | 25 | 25 | 50 | 750 | 750 | 19.0 |
| 118 | 28 | 3 | 31 | 780 | 790 | 2.6 |
| 119 | 28 | 7 | 35 | 780 | 210 | 5.9 |
| 120 | 33 | 1 | 35 | 990 | 280 | 1.6 |

21 Heat-cured product of resol
22 Hexamine heat-cured product of novolak
23 Cured novolak fibers

TABLE 12

| Run No. | Content of particles with a size of 0.1–50 microns (%) | Content of particles with a size of 0.1–100 microns (%) | Proportion of particles which passed through a 150 Tyler mesh sieve (wt. %) | IR intensity ratio | | |
|---|---|---|---|---|---|---|
| | | | | $D_{1580-1650}/D_{1450-1500}$ | $D_{1280-1360}/D_{1450-1500}$ | $D_{960-1020}/D_{1450-1500}$ |
| 101 | 13 (86) | 13 (100) | 13 (87) | 0.31 | 0.29 | 0.10 |
| 102 | 6 (45) | 6 (58) | 6 (52) | 0.46 | 0.53 | 0.53 |
| 103 | 32 (91) | 32 (98) | 32 (93) | 0.73 | 0.46 | 0.14 |
| 104 | 56 | 78 | 65 | 1.67 | 0.73 | 0.45 |
| 105 | 38 | 47 | 58 | 1.41 | 0.86 | 0.47 |
| 106 | 7 (18) | 7 (39) | 7 (66) | 1.36 | 0.75 | 0.48 |
| 107 | 99 | 99 | 93 | 1.34 | 0.88 | 0.31 |
| 108 | 90 | 99 | 88 | 1.26 | 0.97 | 0.38 |
| 109 | 78 | 85 | 72 | 1.18 | 0.65 | 0.29 |
| 110 | 92 | 100 | 87 | 1.29 | 0.96 | 0.23 |
| 111 | 43 | 87 | 68 | 1.16 | 0.85 | 0.37 |
| 112 | 100 | 100 | 100 | 1.37 | 1.10 | 0.29 |
| 113 | 100 | 100 | 100 | 1.26 | 1.08 | 0.26 |
| 114 | 72 | 77 | 66 | 1.38 | 0.54 | 0.19 |
| 115 | 50 | 76 | 76 | 1.54 | 0.97 | 0.56 |
| 116 | 84 | 96 | 81 | 1.49 | 0.66 | 0.31 |
| 117 | 10 (63) | 10 (68) | 10 (73) | 1.01 | 0.78 | 0.64 |
| 118 | 38 | 69 | 65 | 1.34 | 0.47 | 0.19 |
| 119 | 46 | 75 | 69 | 1.14 | 0.77 | 0.32 |
| 120 | 7 (18) | 7 (49) | 7 (64) | 0.75 | 0.39 | 0.12 |
| 21 | 17 | — | — | 0.22 | 0.10 | 0.03 |
| 22 | 58 | — | — | 0.50 | 0.13 | 3.73 |
| 23 | 39 | — | — | 0.15 | 0.08 | 0.14 |

In Runs Nos. 101, 102, 106, 117 and 120 in Table 11, a large amount of a sticky resin, a hard large lumpy or plate-like mass formed at the bottom of the separable flasks.

In Runs Nos. 101, 102 and 120, only less than 49 g of a solid was obtained from 25 g of phenol and 25 g of urea used.

The contents of particles having a size of 0.1–50 microns and 0.1–100 microns and the proportion of particles which passed the 150 Tyler mesh sieve given in Table 12 for Runs Nos. 101, 102, 103, 106, 117 and 120 are based on the entire solid including the sticky resin, lumpy mass and plate-like mass. The contents of these and the proportion of the particles which passed through the 150 Tyler mesh sieve, based on the granular or powdery product alone in the resulting solid, are given in the parentheses in Table 12.

FIG. 2 shows an infrared absorption spectral chart of the granular or powdery product obtained in Run No. 112, and also illustrates how to determine $t_p$ and $t_b$, which are required in obtaining the absorption intensity D, from the infrared absorption spectral chart. A base line is drawn across a certain peak, and $t_p$ and $t_b$ can be determined at the wavelength of the peak as illustrated.

REFERENTIAL EXAMPLE 6

Ten kilograms of a mixed aqueous solution containing 18% by weight of hydrochloric acid and 11% by weight of formaldehyde was put in each of six 20-liter reaction vessels in a room kept at a temperature of 21° to 22° C. While the mixed aqueous solution was stirred at 23° C., a mixed aqueous solution containing 30% by weight of phenol, 20% by weight of urea and 11% by weight of formaldehyde was added in an amount of 3.34 kg, 2.66 kg, 1.60 kg, 1.06 kg, 0.74 kg, and 0.45 kg, respectively. The bath ratio at this time was 7.0, 8.5, 13.5, 20.0, 28.0, and 45.0, respectively. In all runs, when the stirring was continued after the addition of the mixed aqueous solution containing phenol, the mixture abruptly become whitely turbid in 10 to 60 seconds. The stirring was stopped as soon as the mixture became whitely turbid. The mixture was then left to stand for 3 hours. The temperature of the mixture gradually rose, and in 30 minutes after it became whitely turbid, the formation of a white slurry-like or resin-like product was observed. With stirring, the reaction mixture was washed with water. With the reaction mixture obtained at a bath ratio of 7.0, a large amount of a resinous hardened product melt-adhered to the stirring rod, and the stirring became very difficult.

The contents of the reaction vessel were treated in a 0.3% by weight aqueous solution of ammonia at 30° C. for 2 hours with slow stirring, washed with water, and dehydrated. The resulting granular or powdery product or mass was lightly crumpled by hand, and dried at 40° C. for 3 hours. After drying, the products had a water, content of less than 0.5% by weight. The contents of the vessels are designated as Runs Nos. 131, 132, 133, 134, 135 and 136 in the increasing order of the bath ratio.

Table 13 summarizes the maximum temperature reached of the reaction system during the time from the initiation of the reaction to 3 hours after the reaction system became whitely turbid, the yield of the reaction product, the presence or absence of spherical primary particles by microscopic observation, the proportion of particles which passed through a 150 Tyler mesh sieve, the bulk density of the particles which passed through the 150 Tyler mesh sieve, the heat fusibility of the reaction product at 100° C., the methanol solubility of the product, and the free phenol content of the product.

TABLE 13

| Run No. | Bath ratio | Maximum temperature of the reaction system reached (°C.) | Yield (wt. %) | Proportion of particles which passed through a 150 Tyler mesh sieve (wt. %) | Bulk density of the 150 Tyler mesh under particles (g/cc) | Presence or absence of spherical primary particles | Fusibility at 100° C. | Methanol solubility (wt. %) | Free phenol content (ppm) |
|---|---|---|---|---|---|---|---|---|---|
| 131 | 7.0 | 39.5 | 100 | 11 | 0.19 | Little | Melt-adhered | 83.8 | 150 |
| 132 | 8.5 | 39.0 | 113 | 56 | 0.16 | Much | " | 67.7 | 50 |
| 133 | 13.5 | 38.0 | 124 | 88 | 0.14 | Mostly | " | 60.4 | 35 |
| 134 | 20.0 | 36.5 | 128 | 100 | 0.12 | " | " | 53.6 | 30 |
| 135 | 28.0 | 36.0 | 128 | 100 | 0.11 | " | " | 54.4 | 25 |
| 136 | 45.0 | 36.0 | 129 | 99 | 0.11 | " | " | 52.6 | 25 |
| 21 | (Comparison; see Table 1) | | — | — | 0.62 | None | Infusible | Not more than 1 | Below 5 |
| 22 | " | | — | — | 0.46 | " | Melt-adhered | 1.6 | " |
| 23 | " | | — | — | 0.24 | " | Infusible | Not more than 1 | " |

In Table 13, the free phenol contents in Runs Nos. 21, 22 and 23 are values measured with regard to resol and novolak resins before heat-curing and are indicated in the parentheses.

In Run No. 131 shown in Table 13, a sticky resin and a lumpy mass formed in an amount of about 80% based on the entire solid formed at the bottom of the flask, and the proportion of the resulting granular or powdery product was only about 20% based on the entire solid. About 85% of such granular or powdery product passed through a 100 Tyler mesh sieve. The "little" in the column of the presence or absence of spherical primary particles indicated in Table 13 for Run No. 131 was because the proportion of the granular or powdery product based on the entire solid product was as small as about 20%. Hence, the method of Run No. 131 cannot be recommended as a manufacturing method, but the resulting granular or powdery product sufficiently has the properties of the granular or powdery product suitably used in this invention.

Almost 100% of each of the granular or powdery products obtained in Runs Nos. 131 to 136 consisted of particles having a particle size of 0.1 to 100 microns.

REFERENTIAL EXAMPLE 7

A 2-liter separable flask was charged with 1,250 g of a mixed aqueous solution at 24° C. containing 20% by weight of hydrochloric acid and 8% by weight of formaldehyde, and while it was stirred, a solution of each of the phenols shown in Table 14 and each of the nitrogen compounds shown in Table 14 diluted to a concentration of 20 to 80% by weight with 37% by weight formalin was added so that the total amount of the phenol and the nitrogen-containing compound became 50 g. As soon as the solution containing the phenol and the nitrogen-containing compound were added, the mixture became turbid, and in some Runs, instantaneously turned white, pink or brown. In 10 seconds after the addition of the solution, the stirring was stopped. After the stopping of the stirring, the mixture was allowed to stand for 60 minutes. Again with stirring, it was heated to 75° C. over 30 minutes, and maintained at 73° to 76° C. for 60 minutes. The reaction product was washed with water, treated at 45° C. for 60 minutes in a mixed aqueous solution containing 0.3% by weight of ammonia and 60% by weight of methanol, washed with water, and finally dried at 80° C. for 3 hours.

Table 14 summarizes the types and proportions of the phenol and the nitrogen-containing compound used, the concentrations of the phenol and the nitrogen-containing compound in the formalin-diluted solution, the color of the reaction product observed 60 minutes after the addition of the resulting diluted solution, the yield of the reaction product based on the total amount of the phenol and the nitrogen-containing compound, the content of particles having a size of 0.1 to 50 microns in the reaction product, the proportion of particles which passed through a 150 Tyler mesh sieve, the IR intensity ratios, and the heat resistance of the product.

REFERENTIAL EXAMPLE 8

Each of six 1-liter separable flasks was charged with 1,000 g of a mixed aqueous solution at 18° C. containing 18% by weight of hydrochloric acid and 9% by weight of formaldehyde. The room temperature was 15° C. While the solution was stirred, 15 g of urea was dissolved in it, and then 25 g of a mixed diluted solution containing 80% by weight of phenol and 5% by weight of formaldehyde was added at a time. Ten seconds after the addition of the diluted solution, the stirring was stopped, and the solution was left to stand. In all Runs, the solution abruptly become whitely turbid in 18 to 19 seconds after the stopping of the stirring, and the formation of a milk-white product was observed. The temperature of the solution gradually rose from 18° C., and reached a peak at 31°-32° C. in 5 to 7 minutes after the addition of the diluted solution of phenol, and then decreased. The flask was left to stand at room temperature for 0.5 hour (Run No. 161), 1 hour (Run No. 162), 3 hours (Run No. 163), 6 hours (Run No. 164), 24 hours

TABLE 14

| Run No. | Proportion of the materials used (wt. %) Phenol | Nitrogen-containing compound | | Concentration of the material in the diluted solution (wt. %) | Color of the reaction product (60 minutes after addition) |
|---|---|---|---|---|---|
| 137 | Phenol 100 | Urea | 0 | 80 | Pink |
| 138 | Phenol 97 | Urea | 3 | " | " |
| 139 | Phenol 94 | Urea | 6 | " | " |
| 140 | Phenol 75 | Urea | 25 | 50 | Pale pink |
| 141 | Phenol 55 | Urea | 45 | 40 | White |
| 142 | Phenol 35 | Urea | 64 | 30 | " |
| 143 | Phenol 25 | Urea | 75 | 20 | " |
| 144 | Phenol 10 | Urea | 90 | 20 | " |
| 145 | Phenol 50 | N,N'—dimethylolurea | 50 | " | " |
| 146 | Phenol 75 | Aniline | 25 | 80 | Reddish brown |
| 147 | Phenol 50 | Melamine | 50 | " | White |
| 148 | Phenol 50 | Urea | 50 | 40 | " |
| 149 | Phenol 50 | Urea | 50 | " | Red |
| 150 | Phenol/resorcinol (= 34/33) | Urea | 33 | 40 | Red |
| 151 | Phenol/t-butylphenol (= 40/20) | Urea | 40 | " | Brown |
| 152 | Phenol 50 | Urea/melamine (=25/25) | | 50 | White |
| 21 | Heat-cured resol resin | | | | |
| 22 | Hexamine heat-cured novolak resin | | | | |
| 23 | Cured novolak fibers | | | | |

| Run No. | Yield (wt. %) | Contents of the particles having a size of 0.1 to 50 microns (%) | Proportion of particles which passed through a 150 Tyler mesh sieve (wt. %) | IR intensity ratio $D_{1580-1650}/D_{1450-1500}$ | $D_{1280-1350}/D_{1450-1500}$ | $D_{960-1020}/D_{1450-1500}$ | Heat resistance test (°C.) |
|---|---|---|---|---|---|---|---|
| 137 | 118 | 91 | 98 | 0.25 | 0.18 | 0.44 | 750 |
| 138 | 108 | 90 | 98 | 0.27 | 0.18 | 0.31 | 420 |
| 139 | 112 | 97 | 100 | 0.57 | 0.21 | 0.30 | 280 |
| 140 | 128 | 100 | 100 | 1.24 | 0.95 | 0.19 | 200 |
| 141 | 132 | 100 | 100 | 1.32 | 1.10 | 0.29 | " |
| 142 | 115 | 100 | 100 | 1.37 | 1.08 | 0.29 | " |
| 143 | 76 | 100 | 100 | 1.37 | 0.99 | 0.30 | " |
| 144 | 31 | 100 | 100 | 1.24 | 0.96 | 0.27 | " |
| 145 | 105 | 94 | 100 | 1.19 | 0.88 | 0.38 | " |
| 146 | 101 | 82 | 88 | 1.21 | 1.03 | 0.20 | " |
| 147 | 86 | 100 | 96 | 1.15 | 0.75 | 0.28 | " |
| 148 | 109 | 100 | 100 | 1.31 | 1.02 | 0.27 | " |
| 149 | 100 | 72 | 83 | 1.33 | 0.99 | 0.26 | " |
| 150 | 132 | 91 | 94 | 1.25 | 0.99 | 0.25 | " |
| 151 | 84 | 96 | 96 | 1.16 | 0.96 | 0.19 | " |
| 152 | 102 | 95 | 100 | 1.24 | 1.01 | 0.30 | " |
| 21 | | 17 | | 0.22 | 0.10 | 0.03 | 720 |
| 22 | | 58 | | 0.50 | 0.13 | 3.73 | 610 |
| 23 | | 39 | | 0.15 | 0.08 | 0.14 | 740 |

(Run No. 165), and 72 hours (Run No. 166), respectively, after the addition of the diluted phenol solution. Then, the contents of the flask were treated in a 0.75% by weight aqueous solution of ammonia at 15° to 17° C. for 3 hours, washed with water, dehydrated, and finally dried at 40° C. for 6 hours.

Table 15 summarizes the proportion of particles which passed through a 150 Tyler mesh sieve, the $D_{960-1020}/D_{1450-1500}$ ratio, the methanol solubility, and the free phenol content of the resulting dried products. The samples obtained in Runs Nos. 161 to 166 all melt-adhered in a fusibility test conducted at 100° C. for 5 minutes.

TABLE 15

| Run No. | Standing time at room temperature (hours) | Proportion of particles which passed through a 150 Tyler mesh sieve (wt. %) | Methanol solubility (wt. %) | IR intensity ratio ($D_{960-1020}/D_{1450-1500}$) | Free phenol content (ppm) |
|---|---|---|---|---|---|
| 161 | 0.5 | 63 | 99.5 | 0.13 | 280 |
| 162 | 1 | 87 | 97.8 | 0.17 | 70 |
| 163 | 3 | 95 | 85.7 | 0.24 | 45 |
| 164 | 6 | 100 | 63.4 | 0.29 | 30 |
| 165 | 24 | 100 | 40.2 | 0.29 | 20 |
| 166 | 72 | 98 | 35.6 | 0.31 | 15 |

REFERENTIAL EXAMPLE 9

A 1000-liter reaction vessel equipped with a stirring rod was charged with 800 kg of a mixed aqueous solution at 22.5° C. containing 18.5% by weight of hydrochloric acid and 8.5% by weight of formaldehyde, and while the mixed aqueous solution was stirred, 40 kg of a mixed aqueous solution at 20° C. containing 20% by weight of phenol, 10% by weight of hydroquinone and 20% by weight of urea was added.

After adding all of the phenol solution, the mixture was stirred for 20 seconds. The stirring was stopped, and the mixture was left to stand for 2 hours. In the reaction vessel, white suspended particles abruptly formed in 35 seconds after the addition of all of the phenol solution. A white granular product gradually formed, and the temperature of the suspension gradually rose to 35.5° C. and then decreased. The mixed aqueous solution in which the reaction product formed was again stirred, and a valve secured to the bottom of the reaction vessel was opened to withdraw the contents. By using a nonwoven fabric of Nomex (a tradename for a product of E. I. du Pont de Nemours & Co.), the contents were separated into the reaction product and the mixed aqueous solution of hydrochloric acid and formaldehyde. The resulting reaction product was washed with water, dehydrated, dipped for a day and night in a 0.5% by weight aqueous solution of ammonia at 18° C., again washed with water, and dehydrated to give 29.9 kg of the reaction product having a water content of 15% by weight.

2.0 kg of the reaction product thus obtained was dried at 40° C. for 3 hours to give 1.7 kg of a sample (Run No. 167).

Table 16 gives the contents of particles having a size of 0.1 to 50 microns and particles having a size of 0.1 to 100 microns determined by microscopic observation of the resulting dried sample, the proportion of particles which passed through a 150 Tyler mesh sieve, and its methanol solubility.

TABLE 16

| Run No. | Content of 0.1–50 micron particles (%) | Content of 0.1–100 micron particles (%) | Proportion of particles 150 mesh under (wt. %) | Methanol solubility (wt. %) |
|---|---|---|---|---|
| 167 | 100 | 100 | 99 | 58 |

EXAMPLE 6

One hundred grams of the product of Run No. 112 (as a filler) was mixed with 100 g, as solids of the uncured resol resin used in Run No. 21. The mixture was dried at room temperature for a day and night, and thereafter dried in an oven dryer at 80° C. for 30 minutes. A predetermined amount of the resulting dried mixture was treated under a pressure of 200 kg/cm$^2$ for 30 minutes in a mold kept at 150° C. to prepare five molded articles each having a width of 20 mm, a thickness of 3 mm and a length of 120 mm.

Similarly, the resol resin used in Run No. 21 was mixed in equal amounts with the product of Run No. 140, the product of Run No. 147, the product of Run No. 150, the product (cured product) obtained in Run No. 22, wood flour (100 Tyler mesh under), carbon black (100 Tyler mesh under) or silica powder (100 Tyler mesh under) as a filler. From each of the mixtures, five molded articles (precursors) having a width of 20 mm, a thickness of about 3 mm and a length of 120 mm were prepared.

Under a nitrogen gas stream, each of these precursor articles was heated from room temperature to 1000° C. at a rate of 30° C./hour, and maintained at 1000° C. for 60 minutes. The product was gradually cooled to obtain a carbonized product.

Table 17 shows the types of the fillers used, the percent retention of the length of the carbonized product based on that of the precursor, the carbonization yield (based on the precursor), and the Vickers hardness, gas permeability and flexural strength of each of the carbonized products.

TABLE 17

| | | Carbonized product | | | | |
|---|---|---|---|---|---|---|
| Run No. | Type of the filler | Percent retention of the length (%) | Carbonization yield (wt. %) | Hardness (kg/mm$^2$) | Gas permeability (cm$^2$/sec) | Flexural strength (kg/cm$^2$) |
| 171 | Product of Run No. 112 | 79.6 | 65.1 | 910 | $2 \times 10^{-8}$ | 830 |
| 172 | Product of Run No. 140 | 80.9 | 67.8 | 1,020 | $6 \times 10^{-9}$ | 1,150 |
| 173 | Product of Run No. 147 | 80.2 | 64.3 | 970 | $4 \times 10^{-8}$ | 860 |
| 174 | Product of Run No. 150 | 81.1 | 68.2 | 1,070 | $8 \times 10^{-9}$ | 1,070 |
| 175 | Powder of Run No. 22 | Difficult to measure | 59.7 | 430 | 200< | 100> |
| 176 | Wood flour | Difficult to measure | 47.1 | 360 | $10^{-3}$< | 100> |
| 177 | Carbon black | 94.7 | 72.4 | 310 | $10^{-3}$< | 100> |

TABLE 17-continued

| | | Carbonized product | | | |
|---|---|---|---|---|---|
| Run No. | Type of the filler | Percent retention of the length (%) | Carbonization yield (wt. %) | Hardness (kg/mm$^2$) | Gas permeability (cm$^2$/sec) | Flexural strength (kg/cm$^2$) |
| 178 | Silica | 97.3 | 73.3 | 230 | $10^{-3}<$ | $100>$ |

In Table 17, the carbonized articles of Runs Nos. 175 and 176 developed cracks and/or gas blisters, and were either warped or destroyed. Thus, the percent retention of their lengths was difficult to measure. Furthermore, their hardnesses varied greatly.

EXAMPLE 7

The product of Run No. 165 (as a filler) and the uncured resol resin used in Run No. 21 were mixed in various proportions (Runs Nos. 179 to 186). In each run, the resulting mixture was air-dried at room temperature for 24 hours, and then dried at 60° C. for 60 minutes. About 50 g of the dried mixture was divided into ten equal portions, and treated under a pressure of 300 kg/cm$^2$ for 20 minutes in a mold heated to 150° C. between hot presses to give ten molded articles each having a width of 13 mm, a thickness of 3.2 to 3.4 mm and a length of 100 mm. Under a nitrogen gas stream, each of these precursor articles was heated from room temperature to 100° C. over 30 minutes, then maintained at this temperature for 30 minutes, again heated to 1500° C. over 50 hours, and thereafter maintained at this temperature for 2 hours. While passing nitrogen gas continuously, the fired product was allowed to cool for 12 hours to give a carbonized product.

Table 18 shows the mixing proportions of the product of Run No. 165 and the resol resin (as solids), the appearances and densities of the precursor articles, the number of carbonized samples whose cracks or gas blisters were not remarkably observed (good acceptable samples) per 10 samples, and the densities, carbonization yields, flexural strengths and specific electrical resistances of the good samples.

In Run No. 179, no good sample was obtained, and therefore only the density and carbonization yield are shown in the table.

In all of the carbonized products, a vitreous gloss was observed in the fractured surface, and their X-ray diffraction patterns had a broad peak near 22°–24°.

EXAMPLE 8

Forty-five precursor samples were prepared in the same way as in Example 7 from 40 parts by weight of the product of Run No. 141 (as a filler) and 60 parts by weight, as solids of the uncured resol resin used in Run No. 21. In each run, five precursor samples were each heated under a helium gas stream to 350° C. (Run No. 187), 450° C. (Run No. 188), 550° C. (Run No. 189), 650° C. (Run No. 190), 800° C. (Run No. 191), 1000° C. (Run No. 192), 1500° C. (Run No. 193), 1800° C. (Run No. 194), or 2100° C. (Run No. 195) at a rate of 40° C./hour from room temperature, maintained at each of these temperatures (carbonization temperatures) for 3 hours, and thereafter allowed to cool.

Table 19 shows the carbon contents of the carbonized products determined by elemental analysis, and their densities, flexural strengths, specific electrical resistances and X-ray diffraction angles.

TABLE 19

| Run No. | Carbonization temperature (°C.) | Carbon content (wt. %) | Density | Flexural strength (kg/cm$^2$) | Specific electrical resistance (Ω-cm) | X-ray diffraction angle (°) |
|---|---|---|---|---|---|---|
| 187 | 350 | 80.3 | 1.29 | 630 | $10^{13}$ | Not discernible |
| 188 | 450 | 85.6 | 1.35 | 610 | $10^9$ | Not discernible |
| 189 | 550 | 88.7 | 1.38 | 640 | $10^2$ | 22.5 (Very broad) |
| 190 | 650 | 90.4 | 1.42 | 730 | 0.1 | 22.5 (Broad) |
| 191 | 800 | 92.3 | 1.44 | 980 | 0.03 | 23 (Broad) |
| 192 | 1,000 | 93.5 | 1.50 | 1,230 | 0.01 | 23 (Broad) |
| 193 | 1,500 | 95.8 | 1.45 | 1,110 | 0.01 | 23 (Broad) |
| 194 | 1,800 | 97.7 | 1.43 | 970 | 0.01 | 23.5 (Broad) |
| 195 | 2,100 | 99.1 | 1.40 | 820 | 0.01 | 23.5 (Broad) |

EXAMPLE 9

Fifty parts by weight of the product of Run No. 113 (as a filler) was mixed with 50 parts of each of the uncured resol resin used in Run No. 21, the novolak resin obtained in Run No. 22 (containing 10% by weight of hexamethylenetetramine), the product of Run No. 163 (heat-fused product), the product of Run No. 167 (heat-fused product), a furan resin (Hitafuran-303, a tradename for a product of Hitachi Chemical Co., Ltd.), an epoxy resin (Epikote 815, a tradename for a product of Shell Chemical Co.), or coal tar pitch (having a softening point of 125° C. and containing 13.6% by weight of

TABLE 18

| Run No. | Mixing proportions (wt. %) of the product of Run No. 165/the resol resin | Precursor | | Carbonized products | | | |
|---|---|---|---|---|---|---|---|
| | | Appearance | Density | Number of good products per 10 | Density | Carbonization yield (wt. %) | Flexural strength (kg/cm$^2$) | Specific electrical resistance (× 10$^{-3}$ Ω-cm) |
| 179 | 0/100 | Gas blisters formed. | 0.87 | 0 | 1.03 | 54.1 | — | — |
| 180 | 5/95 | Gas blisters formed. | 0.98 | 1 | 1.21 | 55.0 | 410 | 9.2 |
| 181 | 15/85 | Good | 1.15 | 5 | 1.40 | 61.3 | 730 | 7.6 |
| 182 | 25/75 | " | 1.19 | 7 | 1.42 | 63.6 | 1,100 | 5.7 |
| 183 | 35/65 | " | 1.20 | 9 | 1.43 | 65.7 | 1,120 | 5.8 |
| 184 | 50/50 | " | 1.21 | 9 | 1.45 | 66.2 | 1,080 | 6.3 |
| 185 | 80/20 | " | 1.22 | 10 | 1.47 | 64.9 | 1,080 | 7.4 |
| 186 | 100/0 | " | 1.19 | 9 | 1.40 | 63.4 | 920 | 7.9 | a quinoline-insoluble material; a product of Allied Chemical Corporation) in accordance with the method described in Example 7.

The mixture (2.5 g) was molded in the same was as in Example 7, and 10 molded products (precursors) having a width of 13 mm, a thickness of 1.5 to 1.7 mm and a length of 100 mm were prepared.

Each of the precursor articles was heated in a stream of nitrogen gas gradually from room temperature to 1000° C., over 24 hours, maintained at this temperature for 60 minutes, and allowed to cool.

Table 20 summarizes the number of carbonized products (good acceptable products) free from cracks or gas blisters per 10 samples, and the carbonization yields and flexural strengths of the good products.

TABLE 20

| Run No. | Kind of the resin | Carbonized products | | |
|---|---|---|---|---|
| | | Good products per 10 samples | Carbonization yield (wt. %) | Flexural strength (kg/cm$^2$) |
| 196 | Resol resin of Run No. 21 | 9 | 64.3 | 990 |
| 197 | Novolak resin of Run No. 22 | 6 | 63.7 | 740 |
| 198 | Product of Run No. 163 | 10 | 66.5 | 1130 |
| 199 | Product of Run No. 167 | 10 | 65.6 | 1010 |
| 200 | Furan resin | 8 | 62.1 | 870 |
| 201 | Epoxy resin | 5 | 53.8 | 780 |
| 202 | Coal tar pitch | 7 | 82.7 | 820 |

EXAMPLE 10

Five mixtures (Run Nos. 203 to 207) were prepared from 60 parts by weight of the product of Run No. 135 and 40 parts by weight of each of the product of Run No. 150, coconut shell powder having a size of 100 Tyler mesh under obtained by heat-treating coconut shell in a nitrogen atmosphere at 500° C. and pulverizing it, wheat flour having a size of 100 Tyler mesh under, polyvinyl alcohol having a size of 100 Tyler mesh under, or silica powder having a size of 100 Tyler mesh under. Each of these mixtures or the product of Run No. 135 alone (Run No. 208) was extruded into a rope having a diameter of 2 to 3 mm at a temperature of 150° C. through a small-sized extruder (Type 3AGM, made by Sumitomo Heavy Industries, Ltd.). The extrudate was cooled with water and cut to pieces having a length of about 100 mm. The cut products were each dried at 80° C. for 5 hours to form precursor articles.

While steam-containing nitrogen obtained by passing nitrogen through hot water at 80° C. was continuously sent to each of the precursors, it was heated to 900° C. from room temperature over 60 minutes, then maintained at this temperature for 30 minutes, cooled, and withdrawn.

Table 21 summarizes the proportions and kinds of the materials used, the carbonization yields of the carbonized products (based on the precursors), and the apparent densities are specific surface areas (BET method using N$_2$) of the carbonized products, and the amount of benzene adsorbed to saturation at 20° C. to the carbonized products.

TABLE 21

| Run No. | Proportions of the materials used (the product of Run No. 43/the filler) | Carbonized product | | | |
|---|---|---|---|---|---|
| | | Yield (wt. %) | Apparent density (g/cc) | Specific surface area (m$^2$/g) | Amount of benzene adsorbed (g/g) |
| 203 | 60/40 of the product of Run No. 150 | 49 | 0.58 | 770 | 0.27 |
| 204 | 60/40 of the coconut shell powder | 34 | 0.42 | 860 | 0.31 |
| 205 | 60/40 of wheat flour | 37 | 0.47 | 710 | 0.26 |
| 206 | 60/40 of polyvinyl alcohol | 40 | 0.31 | 800 | 0.28 |
| 207 | 60/silica 40 | 68 | 1.32 | 190 | 0.08 |
| 208 | 100/0 | 51 | 0.65 | 630 | 0.21 |

*The amount of adsorbed benzene is the amount of benzene adsorbed at equilibrium which was measured under a saturated vapor pressure at 20° C. in accordance with JIS-K1474-1975.

EXAMPLE 11

Sixty-five parts by weight of the uncured novolak resin used in Run No. 22 (containing 10% by weight of hexamethylenetetramine) was mixed in powder form with 35 parts by weight of each of the product of Run No. 112, the product of Run No. 164, the powder (cured product) of Run No. 21, the powder (cured product) of Run No. 22 and the powder (cured product) of Run No. 23. The mixture was fed into a melter heated to 160° C., extruded through a nozzle having a diameter of 1 mm under a pressure of 5 kg/cm$^2$ and received in a square mold having a depth of 10 mm with each side measuring 50 mm. The resulting plate-like article was cooled to room temperature, heated in a dryer kept at 80° C. for 8 hours, further heat-treated at 120° C. for 4 hours, withdrawn from the mold, pulverized and pressed through a 20-mesh sieve.

The resulting precursor article was placed in an electric furnace, and while continuously sending steam-containing nitrogen obtained by passing nitrogen through hot water at 85° C., the inside of the furnace was heated from room temperature to 850° C. over 90 minutes, and maintained at this temperature for 60 minutes.

Table 22 summarizes the types of the fillers used, the extrudability of the mixed powder from the nozzle, the nitrogen content of the carbonized product, its specific surface area measured by the BET method (N$_2$ method), and the amount of ethylmercaptan adsorbed to the carbonized product.

TABLE 22

| Run No. | Type of the filler | Extrudability of the mixture from the nozzle | product | | |
|---|---|---|---|---|---|
| | | | Nitrogen content (wt. %) | Specific surface area (m$^2$/g) | Amount of ethylmercaptan adsorbed (g/g) |
| 209 | Product of Run No. 112 | Good | 4.9 | 910 | 1.68 |
| 210 | Product of Run No. 164 | Good | 5.8 | 760 | 1.25 |
| 211 | Powder of Run No. 21 | Nozzle blockage gradually occurred. | 0.7 | 470 | 0.29 |

TABLE 22-continued

| Run No. | Type of the filler | Extrudability of the mixture from the nozzle | product Nitrogen content (wt. %) | Specific surface area (m²/g) | Amount of ethylmercaptan adsorbed (g/g) |
| --- | --- | --- | --- | --- | --- |
| 212 | Powder of Run No. 22 | Nozzle blockage gradually occurred. | 1.3 | 590 | 0.46 |
| 213 | Powder of Run No. 23 | Nozzle blockage occurred within a short time. | 0.9 | 280 | 0.17 |

*The amount of ethylmercaptan adsorbed in the amount adsorbed at equilibrium which was measured under a saturated vapor pressure at 20° C. in accordance with JIS-K 1474-1975.

What is claimed is:

1. A process for producing a carbon article, which comprises molding a precursor article under heat from a heat-moldable resin composition at least containing a granular or powdery resin resulting from the condensation of a phenol, an aldehyde and optionally a nitrogen-containing compound having at least two active hydrogens, or from a heat-moldable species of said resin alone, and thereafter carbonizing the precursor article, said granular or powdery resin being characterized in that (A) at least 30% of the granular or powdery resin consists of spherical primary particles and their secondary agglomerated particles, each having a particle diameter in the range of 0.1 to 150 microns, the granular or powdery resin has (B) such a size that at least 50% by weight thereof can pass through a 100 Tyler mesh sieve, and (C) has a free phenol content, determined by liquid chromatography, of not more than 500 ppm, and (D) the granular or powdery resin which is a condensation product of a phenol and an aldehyde has a $D_{990\text{-}1015}/D_{1600}$ ratio of from 0.2 to 9.0 and a $D_{890}/D_{1600}$ ratio of from 0.09 to 1.0 in its infrared absorption spectrum measured by a KBr tablet method, in which $D_{1600}$ represents the absorption intensity of an absorption peak at 1600 cm$^{-1}$, $D_{990\text{-}1015}$ represents the highest absorption intensity of absorption peaks in the range of 990 to 1015 cm$^{-1}$, and $D_{890}$ represents the absorption intensity of an absorption peak at 890 cm$^{-1}$, and the granular or powdery resin which is the nitrogen-containing condensation product of a phenol, an aldehyde and a nitrogen-containing compound having at least two active hydrogens has a $D_{960\text{-}1020}/D_{1450\text{-}1500}$ ratio of from 0.1 to 2.0 in its infrared absorption spectrum measured by a KBr tablet method in which $D_{1450\text{-}1500}$ represents the highest absorption intensity of absorption peaks in the range of 1450 to 1500 cm$^{-1}$, and $D_{960\text{-}1020}$ represents the highest absorption intensity of absorption peaks in the range of 960 to 1020 cm$^{-1}$.

2. The process of claim 1 wherein at least 70% by weight of the granular or powdery resin has a size that can pass through a 100 Tyler mesh sieve.

3. The process of claim 1 wherein at least 30% of the granular or powdery resin consists of spherical primary particles and their secondary agglomerated particles each having a particle diameter of 0.1 to 100 microns.

4. The process of claim 1 wherein at least 70% by weight of the granular or powdery resin has a size that can pass through a 150 Tyler mesh sieve.

5. The process of claim 1 wherein the granular or powdery resin has a $D_{1280\text{-}1360}/D_{1450\text{-}1500}$ ratio of from 0.15 to 3.0 in its infrared absorption spectrum measured by a KBr tablet method in which $D_{1280\text{-}1360}$ represents the highest absorption intensity of absorption peaks in the range of 1280 to 1360 cm$^{-1}$, and $D_{1450\text{-}1500}$ represents the highest absorption intensity of absorption peaks in the range of 1450 to 1500 cm$^{-1}$.

6. The process of claim 1 wherein granular or powdery resin is at least partly fused when maintained at 100° C. for 5 minutes in accordance with the heat fusibility test described in the specification.

7. The process of claim 1 wherein the granular or powdery resin has a methanol solubility, S defined by the following equation, of at least 20% by weight $$S = \frac{W_o - W_1}{W_o} \times 100 \, (\%)$$

wherein $W_o$ is the weight in grams of the resin, and $W_1$ is the weight in grams of the resin left after heating under reflux, when about 10 g of the resin is heated under reflux in 500 ml of substantially anhydrous methanol.

8. The process of claim 1 wherein the granular or powdery resin is not substantially melted or melt-adhered when maintained at 100° C. for 5 minutes in accordance with the heat fusibility test described in the specification.

9. The process of claim 1 wherein the heat-moldable species of the granular or powdery phenol-aldehyde resin is a species of said resin which is at least partly fused when maintained at 100° C. for 5 minutes in accordance with the heat fusibility test described in the specification, or a mixture of said species with a species of the resin which is not substantially melted or melt-adhered when maintained at 100° C. for 5 minutes in accordance with the heat fusibility test described in the specification.

10. The process of claim 1 wherein the heat-moldable resin composition additionally contains another carbonizable material.

11. The process of claim 10 wherein the carbonizable material is a first carbonizable material which is a curable resin.

12. The process of claim 11 wherein the curable resin is a heat-curable resin.

13. The process of claim 12 wherein the heat-curable resin is a resol resin, a novolak resin, an epoxy resin, a furan resin, a melamine resin or a urea resin.

14. The process of claim 10 wherein the carbonizable material is a second material selected from the group consisting of coke, anthracite, coking bituminous coal, pitch and cured products of heat-curable resins.

15. The process of claim 10 wherein the carbonizable material is a second material selected from the group consisting of carbohydrates, derivatives of carbohydrates and naturally occurring materials composed mainly of carbohydrates.

16. The process of claim 10 wherein the carbonizable material is a third material selected from the group consisting of thermoplastic resins and heat-infusible resins other than cured products of curable resins.

17. The process of claim 16 wherein the thermoplastic resins are polyamides, polyvinyl acetate, vinyl chloride resins, vinylidene chloride resins and acrylic resins.

18. The process of claim 16 wherein the heat infusible resins are polyvinyl alcohol and polyvinyl formal.

19. The process of claim 1 or 13 wherein the heat-moldable resin composition further includes an inorganic filler.

20. The process of claim 19 wherein the inorganic filler is silica, alumina, silica-alumina, calcium carbonate, calcium silicate, or a noble metal.

21. The process of claim 1 wherein the heat-moldable resin composition is composed of (a) the granular or powdery phenol-formaldehyde resin, and (b) a curable resin as a first carbonizable material, and/or (c) a second carbonizable material, selected from the group consisting of coke, anthracite, coking bituminous coal, pitch, cure products of heat-curable resins, carbohydrates derivatives of carbohydrates and naturally occurring materials composed mainly of carbohydrates or a third carbonizable material selected from the group consisting of thermoplastic resins and heat-infusible resins other than cured products of curable resins or an inorganic filler; and wherein the proportion of component (a) is at least 10% by weight based on the entire composition, and the proportion of a heat-moldable species of the granular or powdery resin (a) or the second carbonizable material (b), or both is at least 20% by weight based on the entire composition.

22. The process of claim 1 wherein the carbonization is carried out at a temperature of at least about 450° C.

23. The process of claim 1 wherein the carbonization is carried out in a non-oxidizing atmosphere.

24. The process of claim 23 wherein the non-oxidizing atmosphere comprises at least one gas selected from the group consisting of nitrogen, helium, hydrogen and carbon monoxide as a main component.

25. The process of claim 1 wherein the carbonization is carried out in an atmosphere containing steam or carbon dioxide.

26. The process of claim 1 wherein the granular or powdery resin is said condensation product of a phenol and an aldehyde.

27. The process of claim 1 wherein the granular or powdery resin is said nitrogen-containing condensation product of a phenol, an aldehyde and a nitrogen-containing compound having at least two active hydrogens.

* * * * *

UNITED STATES PATENT AND TRADEMARK OFFICE
CERTIFICATE OF CORRECTION

PATENT NO. : 4,466,932
DATED : August 21, 1984
INVENTOR(S) : Hiroaki Koyama and Shigeo Shimizu It is certified that error appears in the above—identified patent and that said Letters Patent is hereby corrected as shown below:

Claim 19, line 1, delete "13", insert --10--.

Claim 21, line 7, delete "cure", insert --cured--;
line 8, before "derivatives", insert --,--.

Signed and Sealed this

Nineteenth Day of March 1985

[SEAL]

Attest:

DONALD J. QUIGG

*Attesting Officer*    *Acting Commissioner of Patents and Trademarks*